US012244388B2

(12) United States Patent
Taherzadeh Boroujeni et al.

(10) Patent No.: US 12,244,388 B2
(45) Date of Patent: Mar. 4, 2025

(54) BEAM SELECTION FOR RANDOM ACCESS MESSAGING

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 229 days.

(21) Appl. No.: 17/502,956

(22) Filed: Oct. 15, 2021

(65) Prior Publication Data

US 2022/0123819 A1    Apr. 21, 2022

Related U.S. Application Data

(60) Provisional application No. 63/092,822, filed on Oct. 16, 2020.

(51) Int. Cl.
*H04B 7/06*      (2006.01)
*H04W 74/0833*   (2024.01)

(52) U.S. Cl.
CPC ...... *H04B 7/0695* (2013.01); *H04W 74/0833* (2013.01)

(58) Field of Classification Search
CPC .. H04B 7/0695; H04B 7/0408; H04B 7/0404; H04W 74/0833
See application file for complete search history.

(56) References Cited

U.S. PATENT DOCUMENTS

| | | | | |
|---|---|---|---|---|
| 2019/0029036 | A1* | 1/2019 | John Wilson | H04W 74/0833 |
| 2019/0222384 | A1* | 7/2019 | Wu | H04W 72/046 |
| 2019/0320430 | A1* | 10/2019 | Kim | H04L 5/0094 |
| 2020/0107275 | A1* | 4/2020 | Cho | H04W 52/362 |
| 2020/0178350 | A1* | 6/2020 | Miao | H04L 5/0055 |
| 2020/0187197 | A1 | 6/2020 | Chen et al. | |
| 2020/0252969 | A1* | 8/2020 | Chen | H04W 74/0833 |
| 2020/0389886 | A1* | 12/2020 | Lee | H04W 76/27 |
| 2021/0067226 | A1* | 3/2021 | Nilsson | H04B 7/0695 |
| 2021/0105822 | A1* | 4/2021 | Hakola | H04W 74/0833 |
| 2021/0112591 | A1* | 4/2021 | Lee | H04W 16/28 |
| 2021/0136823 | A1* | 5/2021 | Kim | H04W 74/0891 |
| 2022/0046724 | A1* | 2/2022 | Maso | H04W 74/0833 |
| 2022/0095372 | A1* | 3/2022 | Cozzo | H04W 72/23 |
| 2023/0032007 | A1* | 2/2023 | Ali | H04B 7/0695 |

OTHER PUBLICATIONS

U.S. Appl. No. 63/062,887, filed Aug. 10, 2020 (Year: 2020).*
U.S. Appl. No. 63/081,056, filed Sep. 21, 2020 (Year: 2020).*

* cited by examiner

*Primary Examiner* — Sun Jong Kim
(74) *Attorney, Agent, or Firm* — Loza & Loza, LLP

(57) ABSTRACT

Aspects relate to random access messaging. A base station may transmit a first random access message (e.g., a random access channel (RACH) Msg2) to a user equipment. The first random access message may include an indication of at least one beam that the user equipment may use to transmit a second random access message (e.g., a RACH Msg3). The user equipment may then transmit the second random access message using a beam selected from the indicated at least one beam.

24 Claims, 19 Drawing Sheets

BEAM SELECTION FOR RANDOM ACCESS MESSAGING

CROSS-REFERENCE TO RELATED APPLICATIONS

The present application for patent claims priority to and the benefit of U.S. Provisional Application No. 63/092,822, titled "BEAM SELECTION FOR RANDOM ACCESS MESSAGING" filed Oct. 16, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to selection of a beam for transmission of a random access message.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station. A UE may initiate a random access procedure to initially gain access to a cell. If the random access procedure is successful, the UE may connect to the cell for subsequent scheduling by the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment may include receiving a first random access message including a first indication of at least one beam to use for a transmission of a second random access message to a base station, and transmitting the second random access message to the base station via a first beam identified based on the first indication.

In some examples, a user equipment may include a transceiver, a memory, and a processor coupled to the transceiver and the memory. The processor and the memory may be configured to receive via the transceiver a first random access message including a first indication of at least one beam to use for a transmission of a second random access message to a base station, and transmit via the transceiver the second random access message to the base station via a first beam identified based on the first indication.

In some examples, a user equipment may include means for receiving a first random access message including a first indication of at least one beam to use for a transmission of a second random access message to a base station, and means for transmitting the second random access message to the base station via a first beam identified based on the first indication.

In some examples, an article of manufacture for use by a user equipment includes a non-transitory computer-readable medium having stored therein instructions executable by one or more processors of the user equipment to receive a first random access message including a first indication of at least one beam to use for a transmission of a second random access message to a base station, and transmit the second random access message to the base station via a first beam identified based on the first indication.

In some examples, a method for wireless communication at a base station may include transmitting a first random access message including a first indication of least one beam selected for a user equipment to use for a transmission of a second random access message, and receiving the second random access message from the user equipment via a first beam of the at least one beam.

In some examples, a base station may include a transceiver, a memory, and a processor coupled to the transceiver and the memory. The processor and the memory may be configured to transmit via the transceiver a first random access message including a first indication of least one beam selected for a user equipment to use for a transmission of a second random access message, and receive via the transceiver the second random access message from the user equipment via a first beam of the at least one beam.

In some examples, a base station may include means for transmitting a first random access message including a first indication of least one beam selected for a user equipment to use for a transmission of a second random access message, and means for receiving the second random access message from the user equipment via a first beam of the at least one beam.

In some examples, an article of manufacture for use by a base station includes a non-transitory computer-readable medium having stored therein instructions executable by one or more processors of the base station to transmit a first random access message including a first indication of least one beam selected for a user equipment to use for a transmission of a second random access message, and receive the second random access message from the user equipment via a first beam of the at least one beam.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
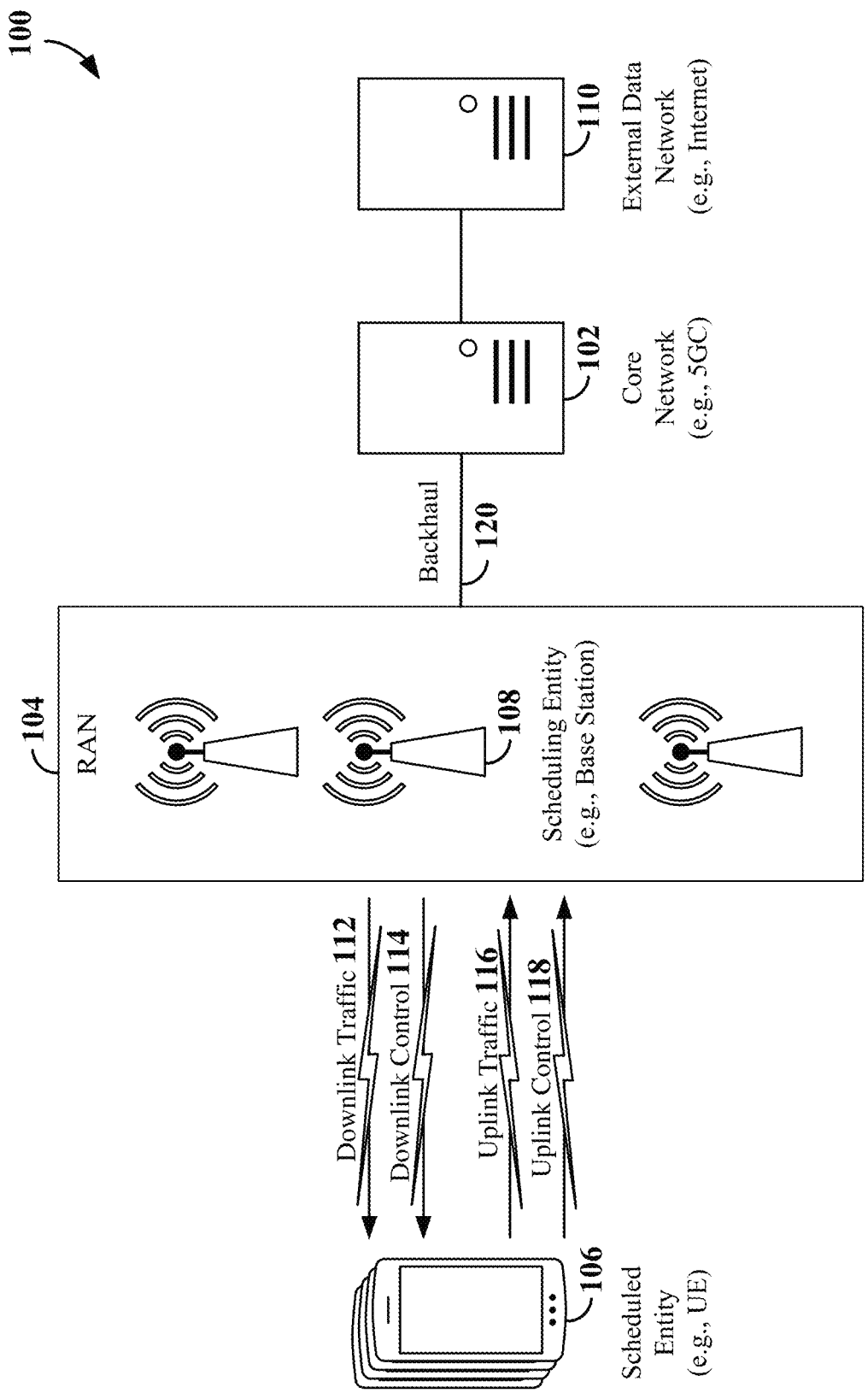
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to random access procedures. In some examples, a base station may transmit a random access response message (e.g., a data channel portion of a Msg2 for a random access procedure) to a UE. The random access response message may include an indication of at least one beam the UE is to use to transmit another random access message (e.g., a Msg3 for the random access procedure). The UE may then transmit the random access response message using a beam selected from the indicated at least one beam.

In some examples, the base station may identify the at least one beam to be indicated to the UE based on a random access message (e.g., a Msg1 for the random access procedure) that the base station received from the UE. For example, the UE may use beam sweeping to transmit repetitions of the Msg1 message over one or more designated random access channel (RACH) occasions. The base station may then measure the received signal strength at each RACH occasion to identify the best beam or the best beams.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
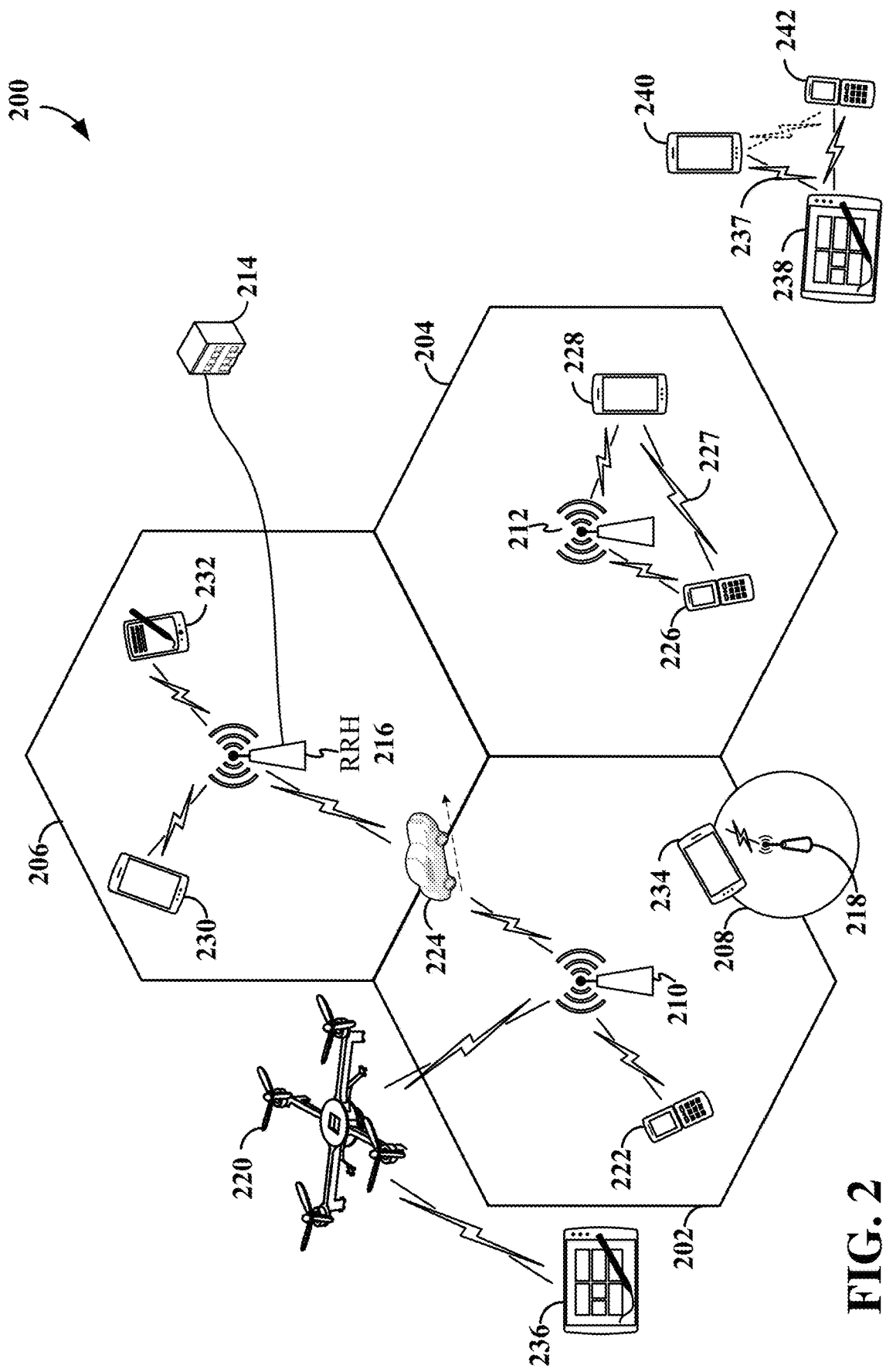
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station.

In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6

GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
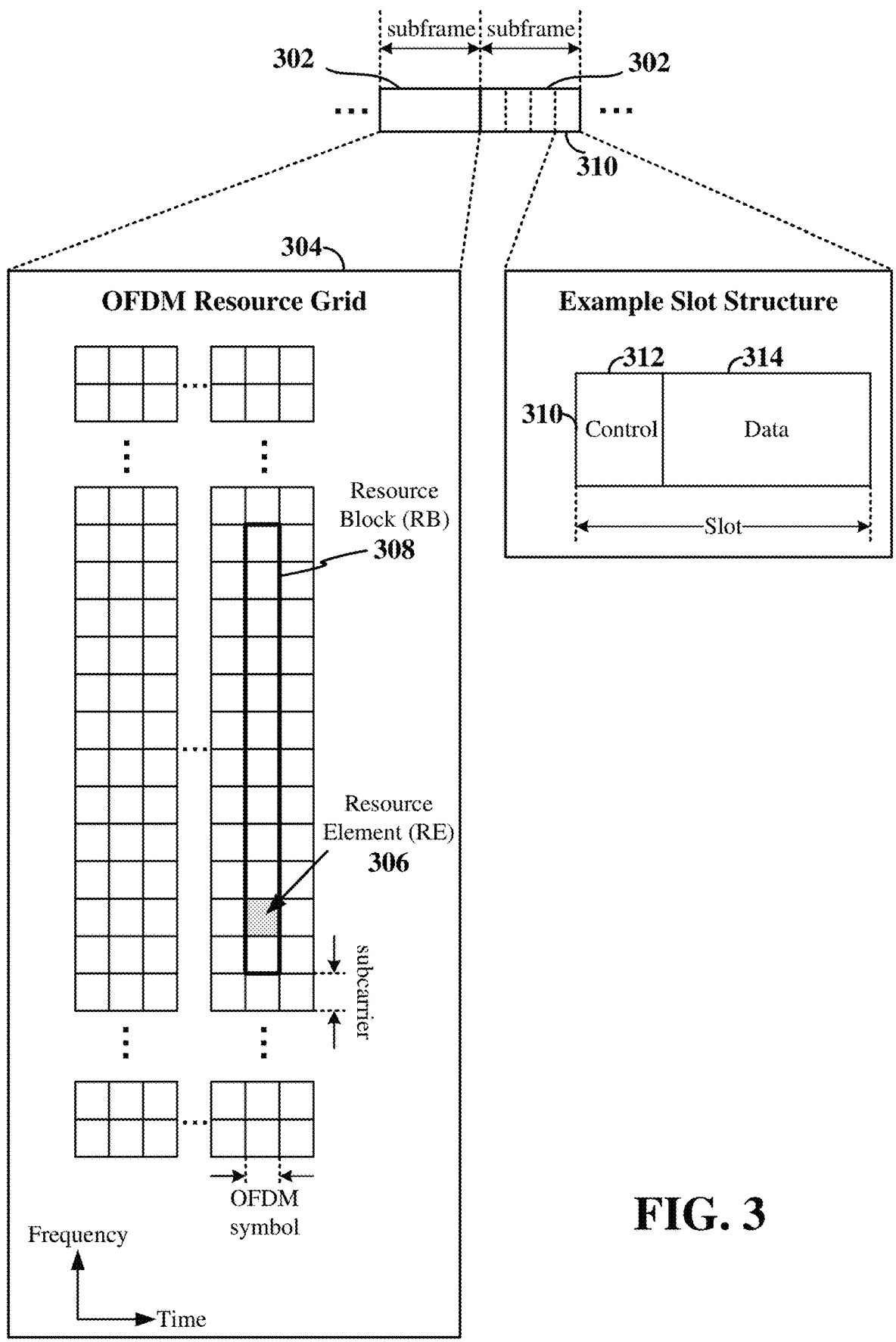
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example.

In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4A:
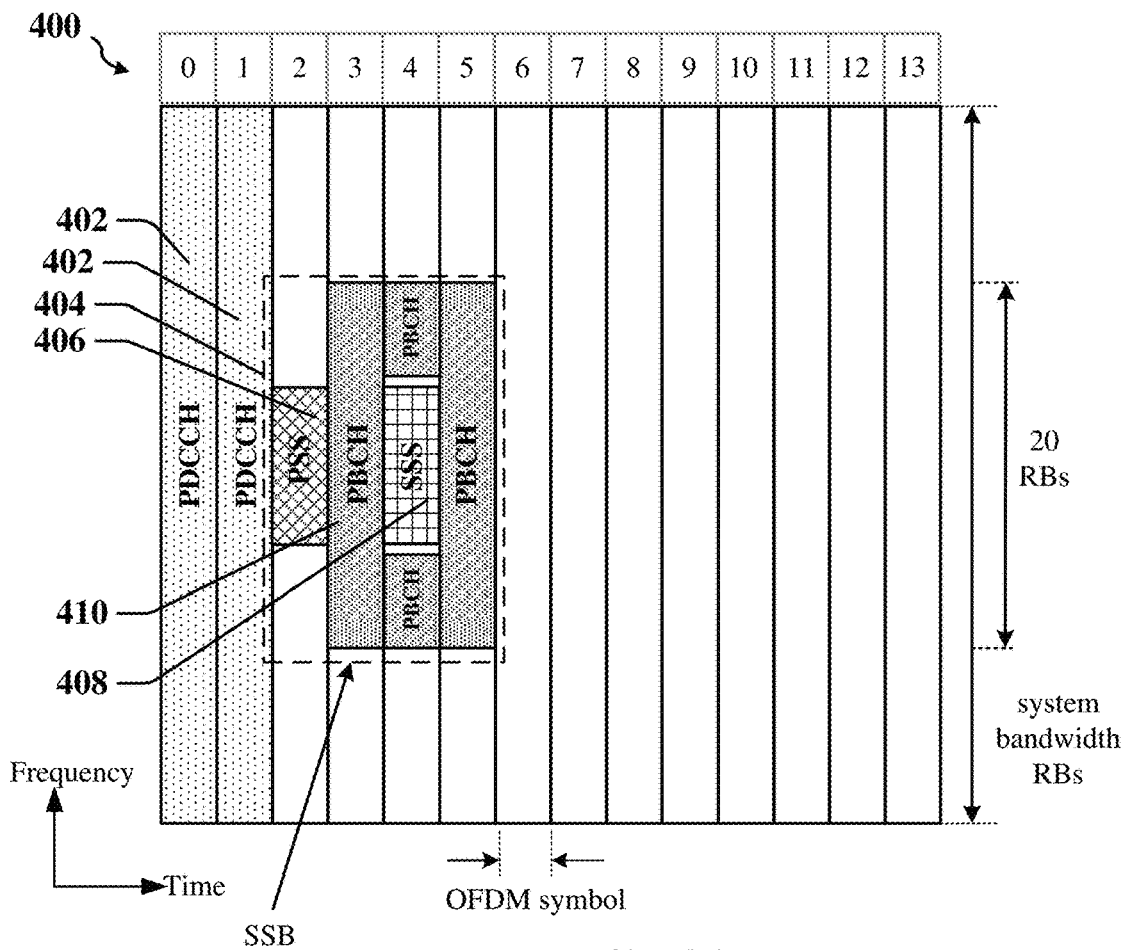
FIG. 4A is a diagram illustrating an example of a frame structure of synchronization signals for use in a wireless communication network according to some aspects.

FIG. 4A illustrates an example 400 of various downlink channels within a subframe of a frame including channels used for initial access and synchronization. As shown in FIG. 4A, a physical downlink control channel (PDCCH) 402 is transmitted in at least two symbols (e.g., symbol 0 and symbol 1) and may carry DCI within at least one control channel element (CCE), with each CCE including nine RE groups (REGs), and each RE group (REG) including four consecutive REs in an OFDM symbol. Additionally, FIG. 4A illustrates an exemplary synchronization signal block (SSB) 404 that may be periodically transmitted by a base station or gNB. The SSB 404 carries synchronization signals PSS 406 and SSS 408 and broadcast channels (PBCH) 410. In this example, the SSB 404 contains one PSS symbol (shown in symbol 2), one SSS symbol (shown in symbol 4) and two PBCH symbols (shown in symbols 3 and 5). The PSS and SSS combination may be used to identify physical cell identities. A UE uses the PSS to determine subframe/symbol timing and a physical layer identity. The SSS is used by a UE to determine a physical layer cell identity group number and radio frame timing. Based on the physical layer identity and the physical layer cell identity group number, the UE can determine a physical cell identifier (PCI). Also, based on the PCI, the UE can determine the locations of the aforementioned DMRS. The physical broadcast channel (PBCH), which carries a master information block (MIB), is logically grouped with the PSS and SSS to form the synchronization signal; i.e., SSB 404. The MIB provides a number of RBs in the system bandwidth and a system frame number (SFN).

Figure 4B:
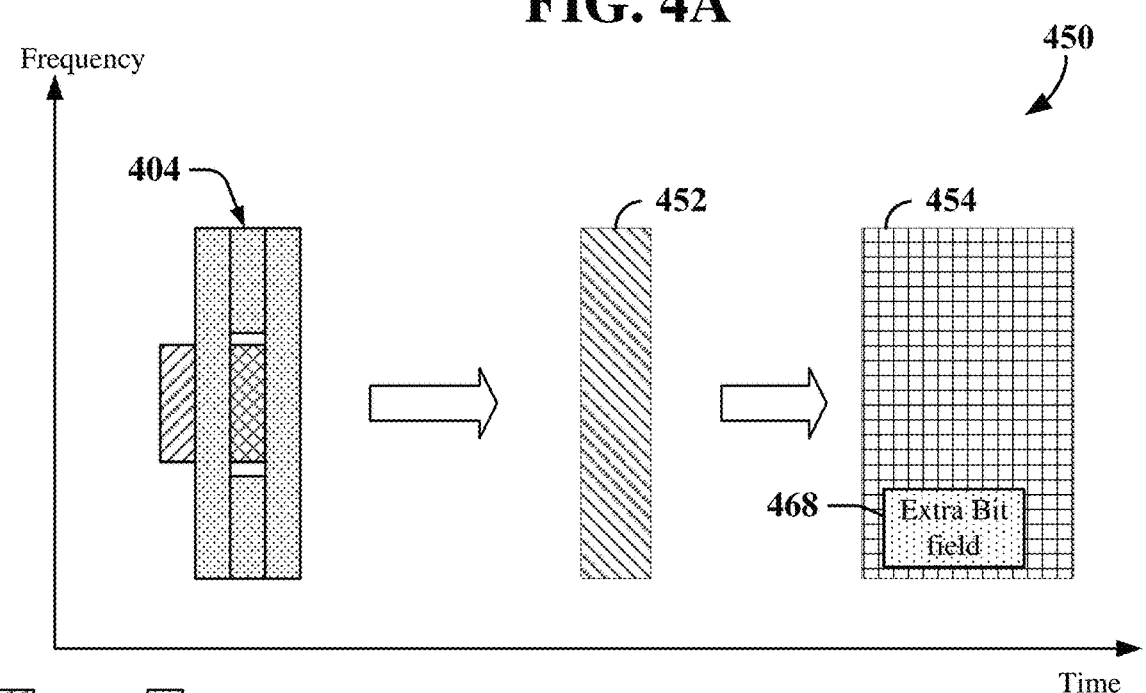
FIG. 4B is a diagram illustrating an example of a portion of a frame or subframe structure with various channels and associated messages for use in a wireless communication network according to some aspects.

FIG. 4B is a diagram illustrating various broadcast information 450 related to initial cell access according to some examples. The broadcast information 450 may be transmitted by a RAN node (e.g., a base station, such as an eNB or gNB) on resources (e.g., time-frequency resources) allocated for the transmission of the broadcast information 450 in a cell. The broadcast information 450 includes SSB 404 illustrated in FIG. 4A. It is noted that the PBCH in SSB 404 includes the MIB carrying various system information (SI) including, for example, a cell barred indication, the subcarrier spacing, the system frame number, and scheduling information for a CORESET0 452. For example, the PBCH in SSB 404 may include scheduling information indicating time-frequency resources allocated for the CORESET0 452. In some examples, the CORESET0 452 may be transmitted within the first four symbols (e.g., within a control region) of a slot. In addition, the CORESET0 452 carries a PDCCH with DCI that contains scheduling information for scheduling the SIB1 454. The SIB1 454 is carried within a physical downlink shared channel (PDSCH) within a data region of a slot. In addition, the SIB1 454 may be referred to as RMSI and includes, for example, a set of radio resource parameters providing network identification and configuration. For example, the set of radio resource parameters may include a bandwidth (e.g., number of BWPs) on which a UE may communicate with a base station.

FIG. 4B also illustrates that the RMSI of the SIB1 message 454 may also include an extra bit field 468. The time/frequency location of this bit field 468 is merely exemplary to show that this bit field 468 utilizes some of the time and frequency resources of the SIB1 message 454.

The MIB in the PBCH may include system information (SI), along with parameters for decoding a SIB (e.g., SIB1). Examples of SI transmitted in the MIB may include, but are not limited to, a subcarrier spacing, a system frame number, a configuration of a PDCCH control resource set (CORESET) (e.g., PDCCH CORESET0), and a search space for SIB 1. Examples of SI transmitted in the SIB1 may include, but are not limited to, a random access search space, downlink configuration information, and uplink configuration information. The MIB and SIB1 together provide the minimum SI for initial access.

A brief discussion of an initial access procedure for a UE using the above information follows. As discussed above, a base station (BS) may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over the PBCH and may broadcast the RMSI and/or the OSI over the PDSCH.

A UE attempting to access a RAN (e.g., the RAN 200 of FIG. 2) may perform an initial cell search by detecting a PSS from a BS (e.g., the PSS of a cell of the BS) of the RAN. The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive the SI from the BS. The system information may take the form of the MIB and SIBs discussed above. The system information may include information that a UE can use to access the network such as downlink (DL) channel configuration information, uplink (UL) channel configuration information, access class information, and cell barring information, as well as other information. The MIB may include SI for initial network access and scheduling information for RMSI and/or OSI. After decoding the MIB, the UE may receive the RMSI and/or the OSI.

The SI includes information that enables a UE to determine how to conduct an initial access to a RAN. In some examples, SIB2 includes random access configuration information (e.g., a RACH configuration) that indicates the resources that the UE is to use to communicate with the RAN during initial access. The random access configuration information may indicate, for example, the resources allocated by the RAN for a PRACH procedure. For example, the RACH configuration may indicate the resources allocated by the network for the UE to transmit a PRACH preamble and to receive a random access response. In some examples, the RACH configuration identifies monitoring occasions (MOs) that specify a set of symbols (e.g., in a PRACH slot) that are scheduled by a base station for the PRACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble in some examples. After obtaining the MIB, the RMSI and/or the OSI, the UE may thus perform a random access procedure for initial access to the RAN.

Figure 5:
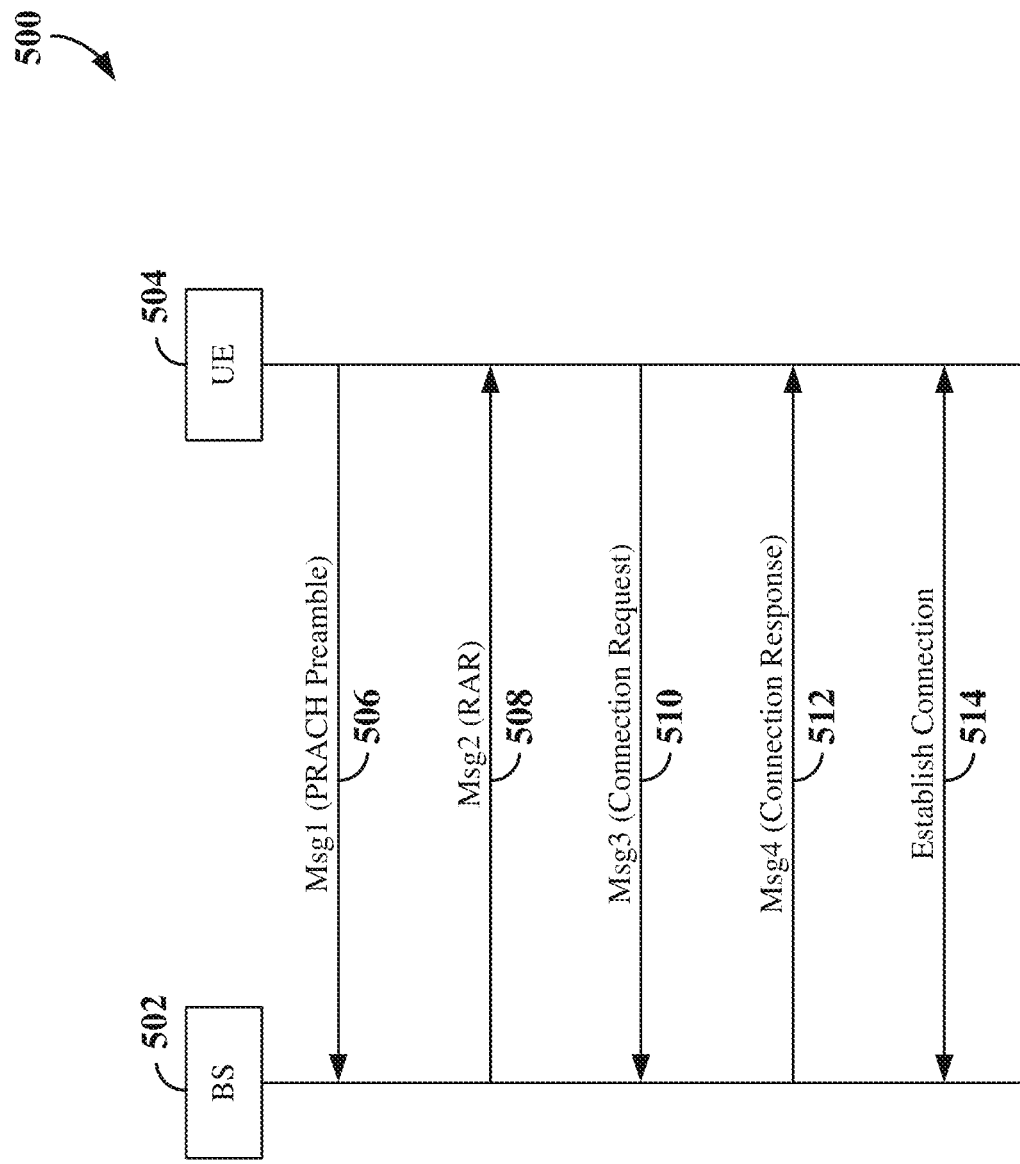
FIG. 5 is a signaling diagram of an example of random access channel (RACH) signaling according to some aspects.

FIG. 5 is a signaling diagram 500 illustrating an example of signaling for a contention-based RACH procedure in a wireless communication system including a base station (BS) 502 and a user equipment (UE) 504. In some examples, the BS 502 may correspond to any of the base stations or scheduling entities shown in any of FIGS. 1, 2, 6, 7, 11, and 16. In some examples, the UE 504 may correspond to any of the UEs or scheduled entities shown in any of FIGS. 1, 2, 6, 7, 11, and 12.

At 506 of FIG. 5, the UE 504 transmit a message 1 (Msg1) of the RACH procedure to the BS 502. In some examples, the Msg1 is a PRACH preamble. RACH Msg1 may be referred to as PRACH. As mentioned above, the UE 504 may transmit the PRACH preamble on resources specified by a RACH configuration included in SIB2.

At 508, the BS 502 responds to the PRACH preamble with a message 2 (Msg2) of the RACH procedure. The RACH Msg2 may be referred to as a random access response (RAR). In some examples of 508, the BS 502 transmits a DCI on a PDCCH, where the DCI schedules a PDSCH (e.g., the DCI specifies the resources for the PDSCH transmission). The BS 502 then transmits the PDSCH which includes RAR data such as, for example, an UL grant for the UE to transmit a message 3 (Msg3) of the RACH procedure.

In some examples, the UE monitors for the RACH Msg2 on resources specified by the RACH configuration during the RAR window specified by the RACH configuration. For example, the UE may decode the DCI carried on the PDCCH and then decode the RAR carried on the PDSCH.

At 510, upon receiving all of the RAR information, the UE 504 transmits a message 3 (Msg3) of the RACH procedure. In some examples, the RACH Msg3 is a connection request.

At 512, the BS 502 responds with a message 4 (Msg4) of the RACH procedure. In some examples, the Msg 4 is a contention resolution message.

At 514, the BS 502 and the UE 504 establish a connection and enter an active operational phase where data may be exchanged. For example, the BS may schedule the UE for UL communication and/or DL communication as discussed herein.

Figure 6:
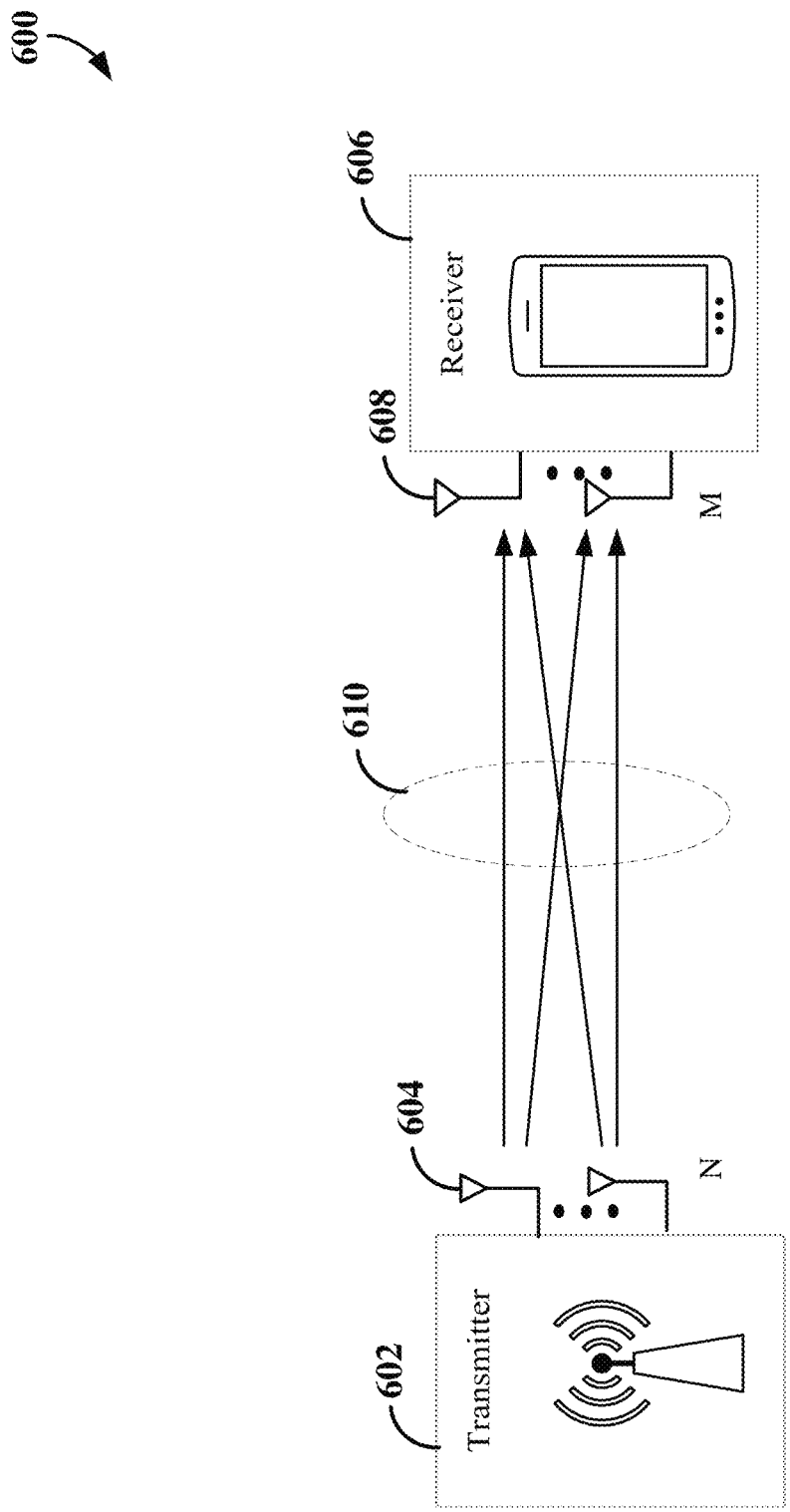
FIG. 6 is a block diagram illustrating an example of a wireless communication system supporting beamforming and/or multiple-input multiple-output (MIMO) communication according to some aspects.

A scheduling entity (e.g., a base station) and/or scheduled entity (e.g., a UE) may be configured for beamforming and/or multiple-input multiple-output (MIMO) technology. FIG. 6 illustrates an example of a wireless communication system 600 supporting beamforming and/or MIMO. In a MIMO system, a transmitter 602 includes multiple transmit antennas 604 (e.g., N transmit antennas) and a receiver 606 includes multiple receive antennas 608 (e.g., M receive antennas). Thus, there are N×M signal paths 610 from the transmit antennas 604 to the receive antennas 608. Each of the transmitter 602 and the receiver 606 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 600 (MIMO system) is limited by the number of transmit or receive antennas 604 or 608, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 6, a rank-2 spatial multiplexing transmission on a 2×2 MIMO antenna configuration will transmit one data stream from each transmit antenna 604. Each data stream reaches each receive antenna 608 along a different signal path 610. The receiver 606 may then reconstruct the data streams using the received signals from each receive antenna 608.

Beamforming is a signal processing technique that may be used at the transmitter 602 or receiver 606 to shape or steer an antenna beam (e.g., a transmit beam or receive beam) along a spatial path between the transmitter 602 and the receiver 606. Beamforming may be achieved by combining the signals communicated via antennas 604 or 608 (e.g., antenna elements of an antenna array module) such that some of the signals experience constructive interference while others experience destructive interference. To create the desired constructive/destructive interference, the transmitter 602 or receiver 606 may apply amplitude and/or phase offsets to signals transmitted or received from each of the antennas 604 or 608 associated with the transmitter 602 or receiver 606.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A base station (e.g., gNB) may generally be capable of communicating with UEs using beams (e.g., downlink transmit beams) of varying beam widths. For example, a base station may be configured to utilize a wider beam when communicating with a UE that is in motion and a narrower beam when communicating with a UE that is stationary.

Figure 7:
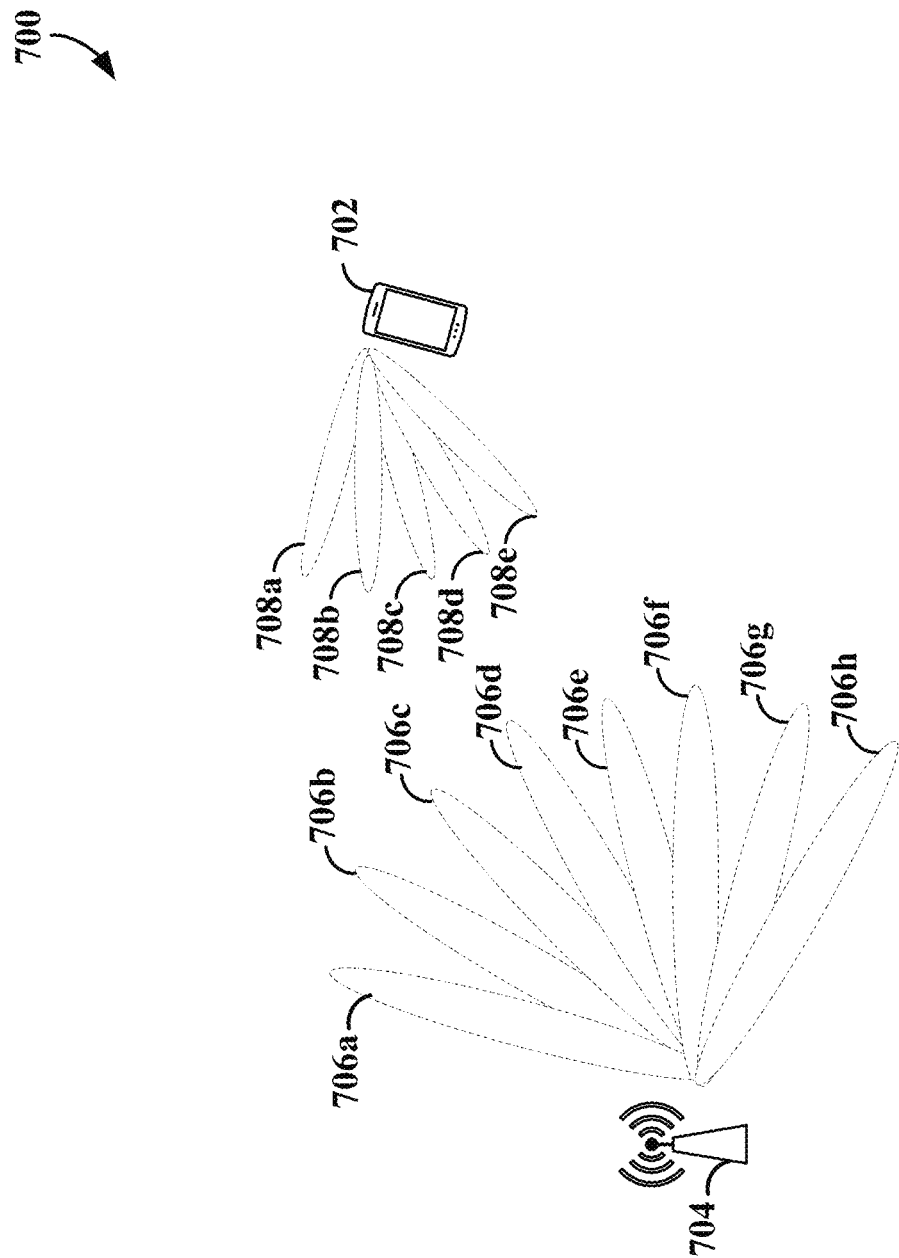
FIG. 7 is a diagram illustrating an example of communication between a radio access network (RAN) node and a wireless communication device using beamforming according to some aspects.

FIG. 7 is a diagram illustrating communication between a base station 704 and a UE 702 using beamformed signals according to some aspects. The base station 704 may be any of the base stations (e.g., gNBs) or scheduling entities illustrated in any of FIGS. 1, 2, 5, 6, 11, and 16, and the UE 702 may be any of the UEs or scheduled entities illustrated in in any of FIGS. 1, 2, 5, 6, 11, and 12.

The base station 704 may generally be capable of communicating with the UE 702 using one or more transmit beams, and the UE 702 may further be capable of communicating with the base station 704 using one or more receive beams. As used herein, the term transmit beam refers to a beam on the base station 704 that may be utilized for downlink or uplink communication with the UE 702. In addition, the term receive beam refers to a beam on the UE 702 that may be utilized for downlink or uplink communication with the base station 704.

In the example shown in FIG. 7, the base station 704 is configured to generate a plurality of transmit beams 706a-706h, each associated with a different spatial direction. In addition, the UE 702 is configured to generate a plurality of receive beams 708a-708e, each associated with a different spatial direction. It should be noted that while some beams are illustrated as adjacent to one another, such an arrangement may be different in different aspects. For example, transmit beams 706a-706h transmitted during the same symbol may not be adjacent to one another. In some examples, the base station 704 and UE 702 may each transmit more or less beams distributed in all directions (e.g., 360 degrees) and in three-dimensions. In addition, the transmit beams 706a-706h may include beams of varying beam width. For example, the base station 704 may transmit certain signals (e.g., SSBs) on wider beams and other signals (e.g., CSI-RSs) on narrower beams.

The base station 704 and the UE 702 may select one or more transmit beams 706a-706h on the base station 704 and one or more receive beams 708a-708e on the UE 702 for communication of uplink and downlink signals therebetween using a beam management procedure. In one example, during initial cell acquisition, the UE 702 may perform a P1 beam management procedure to scan the plurality of transmit beams 706a-706h on the plurality of receive beams 708a-708e to select a beam pair link (e.g., one of the transmit beams 706a-706h and one of the receive beams 708a-708e) for a physical random access channel (PRACH) procedure for initial access to the cell. For example, periodic SSB beam sweeping may be implemented on the base station 704 at certain intervals (e.g., based on the SSB periodicity). Thus, the base station 704 may be configured to sweep or transmit an SSB on each of a plurality of wider transmit beams 706a-706h. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 704 and the UE 702 may perform a P2 beam management procedure for beam refinement. For example, the base station 704 may be configured to sweep or transmit a CSI-RS on each of a plurality of narrower transmit beams 706a-706h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by a gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 702 is configured to scan the plurality of CSI-RS transmit beams 706a-706h on the plurality of receive beams 708a-708e. The UE 702 then performs beam measurements (e.g., RSRP, SINR, etc.) of the received CSI-RSs on each of the receive beams 708a-708e to determine the respective beam quality of each of the CSI-RS transmit beams 706a-706h as measured on each of the receive beams 708a-708e.

The UE 702 can then generate and transmit a Layer 1 (L1) measurement report, including the respective beam index (e.g., CSI-RS resource indicator (CRI)) and beam measurement (e.g., RSRP) of one or more of the CSI-RS transmit beams 706a-706h on one or more of the receive beams 708a-708e to the base station 704. The base station 704 may then select one or more CSI-RS transmit beams on which to transmit unicast downlink control information and/or user data traffic to the UE 702. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 702 may further select a corresponding receive beam on the UE 702 for each selected serving CSI-RS transmit beam to form a respective downlink beam pair link (BPL) for each selected serving CSI-RS transmit beam. For example, the UE 702 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, the base station 704 may configure the UE 702 to perform SSB beam measurements and provide an L1 measurement report containing beam measurements of SSB transmit beams 706a-706h. For example, the base station 704 may configure the UE 702 to perform SSB beam measurements and/or CSI-RS beam measurements for beam failure detection (BRD), beam failure recovery (BFR), cell reselection, beam tracking (e.g., for a mobile UE 702 and/or base station 704), or other beam optimization purpose.

In addition, when the channel is reciprocal, the transmit and receive beams may be selected using an uplink beam management scheme. In an example, the UE 702 may be configured to sweep or transmit on each of a plurality of receive beams 708a-708e. For example, the UE 702 may transmit an SRS on each beam in the different beam directions. In addition, the base station 704 may be configured to receive the uplink beam reference signals on a plurality of transmit beams 706a-706h. The base station 704 then performs beam measurements (e.g., RSRP, SINR, etc.) of the beam reference signals on each of the transmit beams 706a-706h to determine the respective beam quality of each of the receive beams 708a-708e as measured on each of the transmit beams 706a-706h.

The base station 704 may then select one or more transmit beams on which to transmit unicast downlink control information and/or user data traffic to the UE 702. In some examples, the selected transmit beam(s) have the highest RSRP. The UE 702 may then select a corresponding receive beam for each selected serving transmit beam to form a respective beam pair link (BPL) for each selected serving transmit beam, using, for example, a P3 beam management procedure, as described above.

In one example, a single transmit beam (e.g., beam 706d) on the base station 704 and a single receive beam (e.g., beam 708c) on the UE may form a single BPL used for communication between the base station 704 and the UE 702. In another example, multiple transmit beams (e.g., beams 706c, 706d, and 706e) on the base station 704 and a single receive beam (e.g., beam 708c) on the UE 702 may form respective BPLs used for communication between the base station 704 and the UE 702. In another example, multiple transmit beams (e.g., beams 706c, 706d, and 706e) on the base station 704 and multiple receive beams (e.g., beams 708c and 708d) on the UE 702 may form multiple BPLs used for communication between the base station 704 and the UE 702. In this example, a first BPL may include transmit beam 706c and receive beam 708c, a second BPL may include transmit beam 706d and receive beam 708c, and a third BPL may include transmit beam 708e and receive beam 708d.

In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

In some examples, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Random access messages such as PRACH (RACH Msg1), RACH Msg2 PDCCH, and RACH Msg3 PUSCH may have coverage issues, especially for FR2. The disclosure relates in some aspects to using beam refinement to improve the received signal power (by having more beamforming gain for the beam).

In a communication system, such as a 5G NR system operating in FR2, that employs beamforming (e.g., as described in FIGS. 6 and 7), a RACH procedure (e.g., as described in FIG. 5) may be based on beamformed signaling. For example, a UE's transmission of a PRACH preamble and reception of an RAR may involve selecting the beams (e.g., as described in FIG. 7) to be used for these RACH procedures.

Beam refinement can be done at a base station (e.g., gNB) and/or at a UE, for transmission and/or reception. For example, a base station may receive multiple copies of one PRACH via different refined beams, and then select a refined sub-beam of the SSB beam for transmission of RACH Msg2 and reception of RACH Msg3.

The disclosure relates in some aspects to providing coverage enhancement for RACH messages via beam refinement at a UE. In some scenarios, due to the relatively high path loss associated with millimeter-wave frequencies (e.g., FR2), a base station might not be able to reliably decode RACH Msg3 messages sent by a UE. To address this issue, a base station may select the beam or beams that the UE may use to transmit RACH Msg3. For example, a UE may use PRACH repetition with UE transmit beam sweeping when transmitting RACH Msg1 to enable the base station to identify the best beam or beams. The base station may then send via RACH Msg2 an indication of at least one transmit beam that the UE may use for transmitting a RACH Msg3.

In some examples, the UE may transmit repetitions of PRACH over multiple RACH occasions (ROs) associated with one SSB beam, using different transmit beams for each RO. In some examples, the indication of the best UE transmit beam (to be used for transmission of RACH Msg3) may be made via an indication of the associated RO.

In some examples, the number of repetitions to be used for UE beam sweeping may be specified by an indication from the base station (e.g., in RMSI or some other signaling). In some examples, an indication for a UE to use repetition with UE beam sweeping may be specified by an indication from the base station (e.g., in RMSI or some other signaling).

In some examples, applying PRACH repetition with UE transmit beam sweeping may be conditioned on a measurement made by the UE. For example, a UE may elect to use PRACH repetition with UE transmit beam sweeping if an SSB-based RSRP measured at the UE is less than a threshold.

In some examples, the base station may differentiate between UEs that are using PRACH beam sweeping versus UEs that are not using PRACH beam sweeping (e.g., legacy UEs) based on the preamble subsets used by the UEs. For example, the base station may specify (e.g., by sending an indication to the UEs) that one PRACH preamble sequence is to be used by UEs that are doing PRACH beam sweeping while a different PRACH preamble sequence is to be used by UEs that are not doing PRACH beam sweeping. In the latter case, a UE that is not doing PRACH beam sweeping may be a legacy UE that does not support this feature or a UE that has elected to not do PRACH beam sweeping (e.g., if the UE does not currently need PRACH coverage enhancement). By using different preambles, the complexity of the PRACH detection process at the base station may be reduced. For example, the base station can expect that any UEs that transmitted a preamble associated with the PRACH beam sweeping will be transmitting repetitions on multiple ROs or transmitting repetitions within an RO. Conversely, the base station can expect that any UEs that transmitted a preamble not associated with the PRACH beam sweeping will not be transmitting repetitions on multiple ROs or within an RO.

Figure 8:
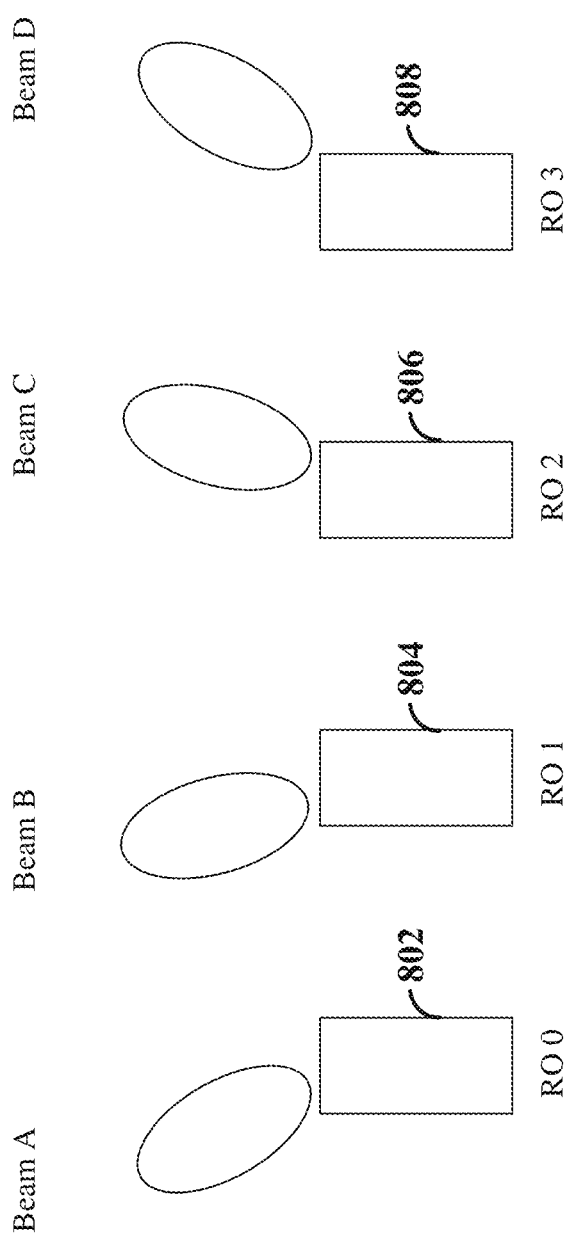
FIG. 8 is a diagram illustrating an example of beam sweeping of a physical random access channel (PRACH) over RACH occasions according to some aspects.

The diagram 800 of FIG. 8 illustrates an example of four RACH occasions: a first RO 802 (RO 0), a second RO 804 (RO 1), a third RO 806 (RO 2), and a fourth RO 808 (RO 3). The UE uses a first beam (beam A) to transmit a first repetition of the RACH Msg1 message during the first RO 802, a second beam (beam B) to transmit a second repetition of the RACH Msg1 message during the second RO 804, a third beam (beam C) to transmit a third repetition of the RACH Msg1 message during the third RO 806, and a fourth beam (beam D) to transmit a fourth repetition of the RACH Msg1 message during the fourth RO 808. In some examples, the first beam, the second beam, the third beam, and the fourth beam may have different beam characteristics (e.g., different directions, different beam widths, etc.). In some examples, the first repetition, the second repetition, the third repetition, and the fourth repetition may include the same information.

Figure 9:
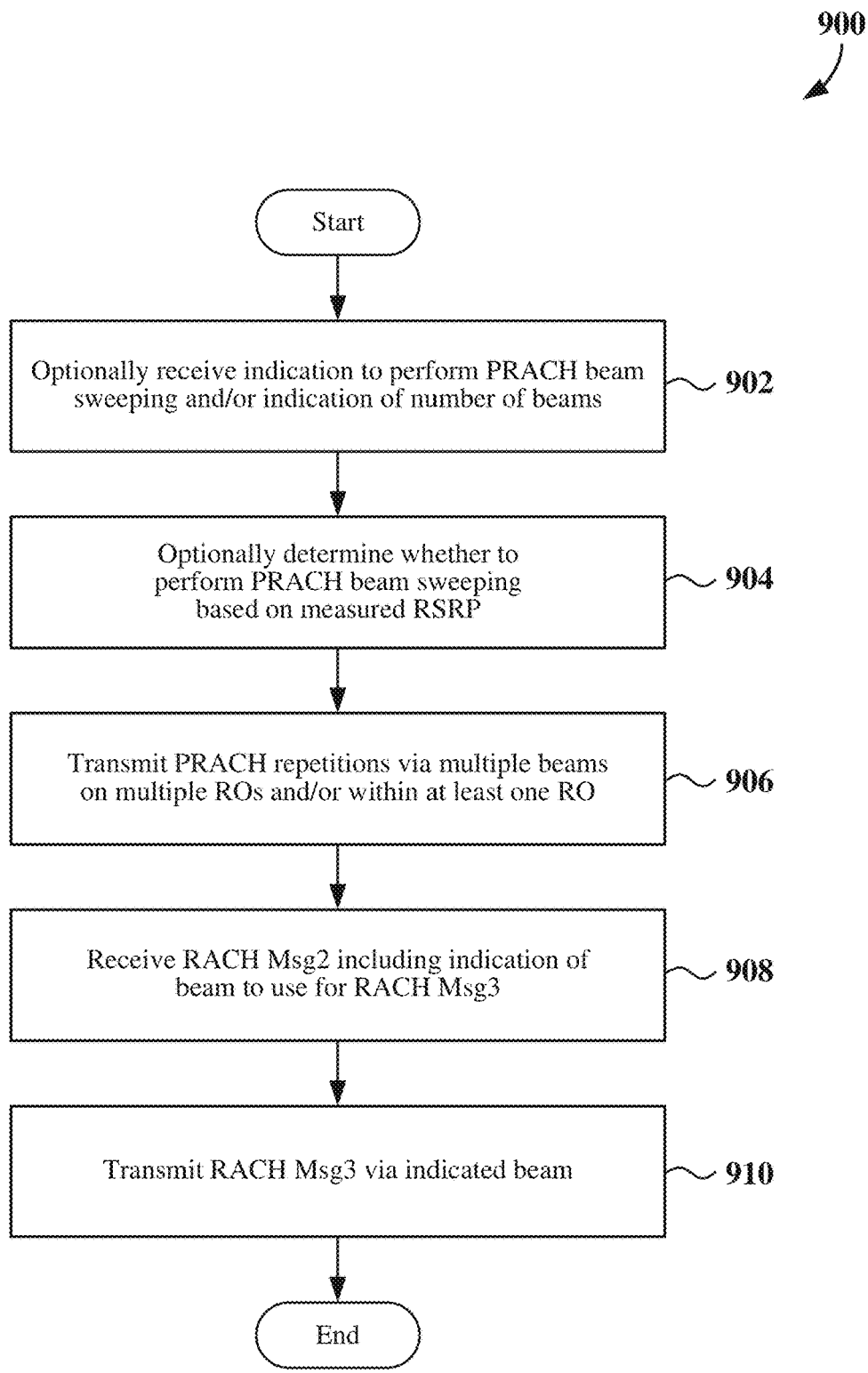
FIG. 9 is a flow chart of an example method for transmitting a random access message via an indicated beam according to some aspects.

FIG. 9 is a flow chart illustrating an example method 900 for wireless communication at a UE in accordance with some aspects of the present disclosure. As described below, some or all illustrated features may be omitted in a particular implementation within the scope of the present disclosure, and some illustrated features may not be required for implementation of all examples. In some examples, the method 900 may be carried out by the UE 1200 illustrated in FIG. 12. In some examples, the method 900 may be carried out by any suitable apparatus or means for carrying out the functions or algorithm described below.

At optional block 902, a UE may receive an indication from a base station to perform PRACH beam sweeping and/or an indication of the number of beams to use for PRACH beam sweeping. In some examples, the UE may receive one or both of these indications via RMSI. In some examples, PRACH beam sweeping by the UE may be enabled upon receipt of one or both of these indication (optionally conditioned on the RSRP measurement of block 904).

At optional block 904, the UE may determine whether to perform PRACH beam sweeping based on measured RSRP. For example, the UE may measure the RSRP of an SSB transmission by the base station. In some examples, if the RSRP is below a threshold (e.g., the UE needs coverage enhancement), PRACH beam sweeping by the UE may be enabled (optionally conditioned on the indication(s) of block 902). In some aspects, this feature may help limit the usage of network resources by avoiding PRACH beam sweeping when a UE does not need coverage enhancement.

At block 906, the UE transmits PRACH repetitions via multiple beams on multiple ROs and/or within at least one RO. For example, based on a first configuration by a base station (e.g., as indicated in RMSI), the UE may use a first beam to transmit a first repetition (e.g., of the PRACH preamble) on a first RO, use a second beam to transmit a second repetition (e.g., of the PRACH preamble) on a second RO, and so on. Here, the number of repetitions transmitted may depend on the number of available ROs. As another example, based on a second configuration by a base station (e.g., as indicated in RMSI), the UE may use a first beam to transmit a first repetition on first portion (e.g., a first set of symbols) of an RO, use a second beam to transmit a second repetition on a second portion (e.g., a second set of symbols) of the RO, and so on. The above examples may be combined as well (e.g., a UE transmits repetitions across ROs and well as within ROs).

At block 908, the UE receives a RACH Msg2 including an indication of which beam to use for transmitting the RACH Msg3. In some examples, the indication includes a beam identifier. For example, if the UE used 4 beams for the PRACH beam sweeping, 2 bits may be used to indicate the strongest of these 4 beams. In some examples, the indication identifies an RO (e.g., the RO within which the strongest RACH Msg1 beam was received). In some examples (e.g., when the UE uses PRACH beam sweeping within an RO), the base station may indicate via RACH Msg2 which beam within the RO the UE is to use for RACH Msg3. For example, 4 bits may be used to indicate which PRACH repetition (e.g., out of up to 12 repetitions) carried the strongest beam.

In 5G NR, a UE may monitor for a RACH Msg2 PDCCH using a cell-specific random access search space (e.g., ra-SearchSpace). The random access search space may specify monitoring occasions (MOs) to be used by a UE for monitoring for a RACH Msg2 PDCCH from a base station. In some examples, the random access search space is configured in a PDCCH common configuration (e.g., PDCCH-ConfigCommon).

At block 910, the UE transmits the RACH Msg3 to the base station via the beam indicated at block 908. Accordingly, by proper selection of the beam for the RACH Msg3, the disclosed RACH Msg3 transmission scheme may provide coverage enhancement for RACH Msg3 (e.g., extending the coverage for a RACH Msg3 PDSCH transmission).

Figure 10:
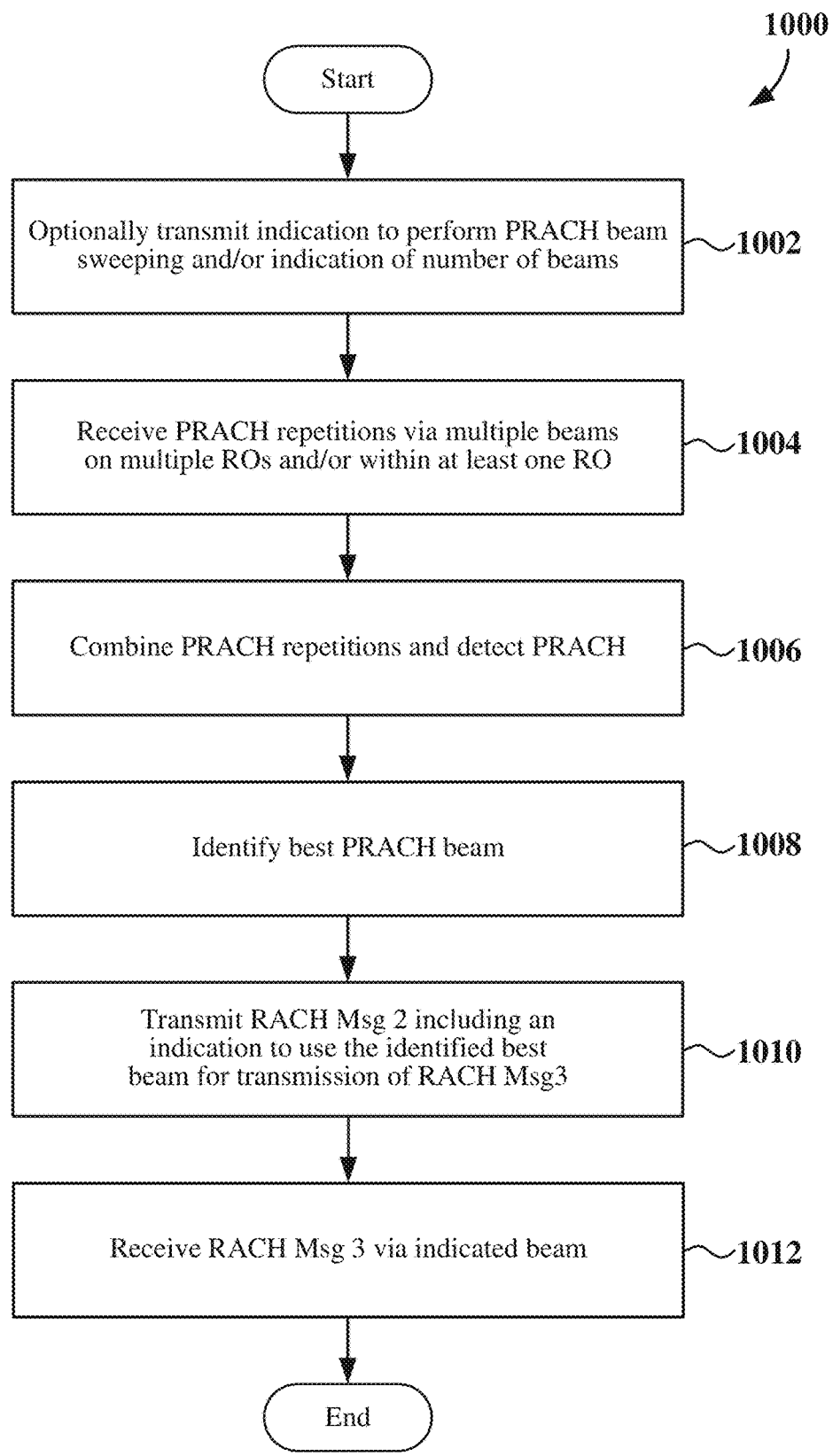
FIG. 10 is a flow chart illustrating an example of a method for indicating a beam for transmission of a random access message according to some aspects.

FIG. 10 is a flow chart illustrating an example method 1000 for wireless communication at a base station (BS) in accordance with some aspects of the present disclosure. As described below, some or all illustrated features may be omitted in a particular implementation within the scope of the present disclosure, and some illustrated features may not be required for implementation of all examples. In some examples, the method 1000 may be carried out by the BS 1600 illustrated in FIG. 16. In some examples, the method

1000 may be carried out by any suitable apparatus or means for carrying out the functions or algorithm described below.

At optional block 1002, a BS may transmit an indication to a UE instructing the UE to perform PRACH beam sweeping and/or an indication of the number of beams the UE is to use for beam sweeping. For example, the BS may elect to provide RACH coverage enhancement for the UE (e.g., as a result of signal measurements made by the BS or as a result of measurement reporting from the UE). The BS may transmit one of these indications or both indications in the RMSI (e.g., in the bit field 468 of FIG. 4B) or in some other manner.

At block 1004, the BS receives PRACH repetitions via multiple beams on multiple ROs and/or within at least one RO. For example, the BS may receive a first repetition on a first RO, receive a second repetition on a second RO, and so on. As another example, the BS may receive a first repetition on first portion (e.g., a first set of symbols) of an RO, receive a second repetition on a second portion (e.g., a second set of symbols) of the RO, and so on.

At block 1006, the BS combines the PRACH repetitions (e.g., using soft combining). The BS then detects the RACH Msg1 based on the combined repetitions.

At block 1008, the BS identifies the best PRACH beam. For example, the BS may conduct signal strength measurements for each RO and compare the signal strength measurements to identify the RO that carried the strongest beam.

At block 1010, the BS transmits a RACH Msg 2 PDSCH to the UE. The RACH Msg 2 PDSCH includes an indication of the beam identified at block 1008 for transmission of the RACH Msg3 message by the UE.

At block 1012, the BS receives the RACH Msg3 message via the beam indicated at block 1010.

Figure 11:
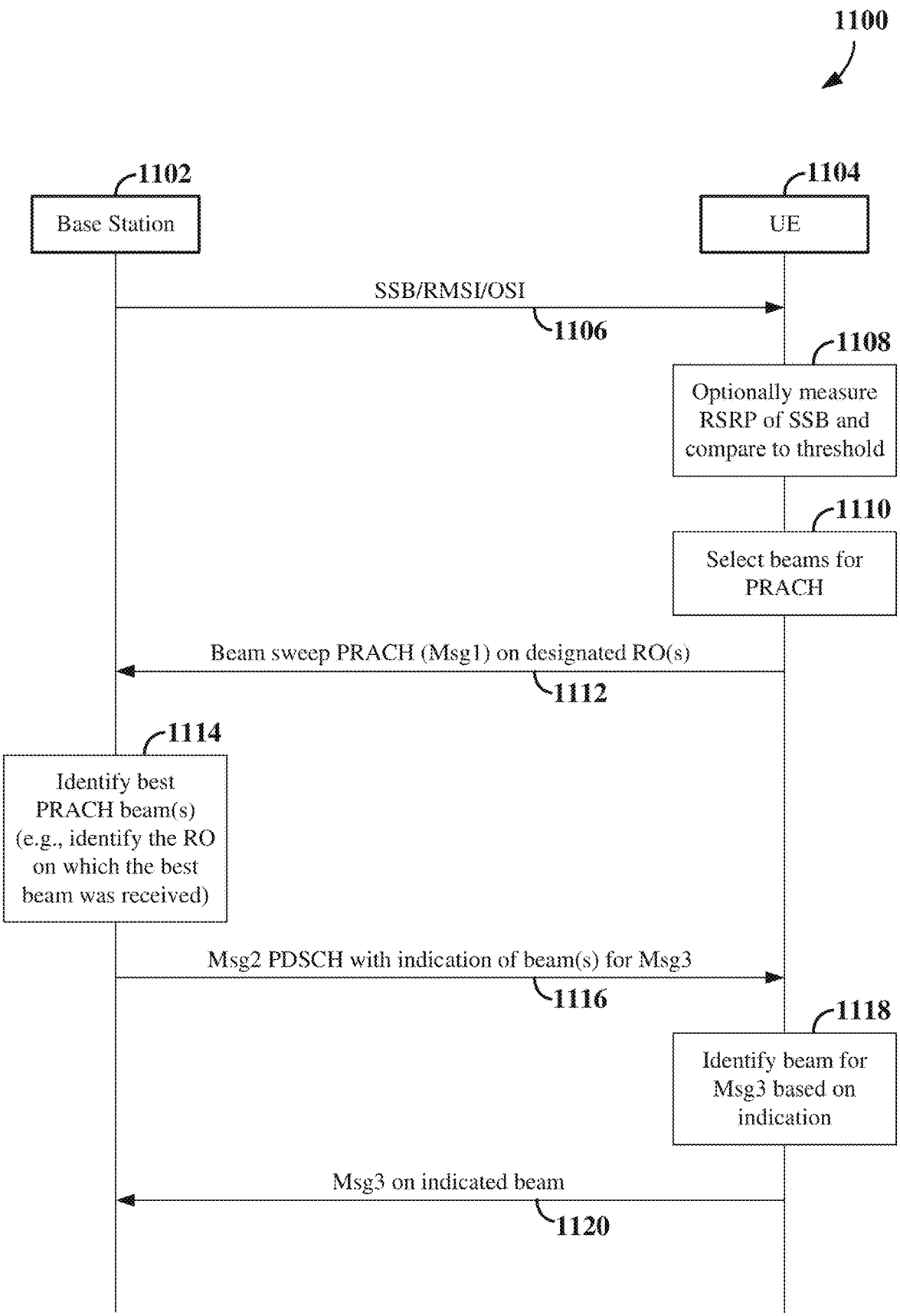
FIG. 11 is a signaling diagram illustrating an example of RACH-related signaling according to some aspects.

FIG. 11 is a signaling diagram 1100 illustrating an example of RACH-related signaling in a wireless communication system including a base station (BS) 1102 and a user equipment (UE) 1104. In some examples, the BS 1102 may correspond to any of the base stations or scheduling entities shown in any of FIGS. 1, 2, 5, 6, 7, and 16. In some examples, the UE 1104 may correspond to any of the UEs or scheduled entities shown in any of FIGS. 1, 2, 5, 6, 7, and 12.

At 1106 of FIG. 11, the BS 1102 broadcasts SSB, RMSI, and OSI. As discussed herein, the BS 1102 may use beam sweeping for these transmissions. In addition, the RMSI may include one or more RACH-related indications as discussed above. Also, the SIB2 in the OSI may specify the ROs the UE 1104 is to use for RACH Msg1 transmission.

At optional 1108, the UE 1104 may measure the RSRP of the SSB. In this case, the UE may elect to perform PRACH beam sweeping if the measured RSRP is less than a threshold. Alternatively, or in addition, the UE may determine whether to perform PRACH beam sweeping based on an indication received at 1106 (e.g., as discussed above at block 902).

At 1110, the UE 1104 selects a set of beams to use for PRACH beam sweeping. In some examples, the selection of the beams to use may be based on a beam sweeping procedure that identifies the best beams for receiving the SSB at 1106. Also, the number of beams selected may be based on an indication received at 1106 (e.g., as discussed above at block 902).

At 1112, the UE 1104 uses different beams to transmit repetitions of a RACH Msg1 message. For example, the UE 1104 may use a first beam to transmit a first repetition on a first RO, use a second beam to transmit a second repetition on a second RO, and so on. Other beam sweeping operations may be used in other examples.

At 1114, the BS 1102 identifies the best PRACH beam (or a set of PRACH beams) based on the repetitions received by the BS 1102 at 1112. Here, the BS 1102 may conduct signal strength measurements for each RO and compare the signal strength measurements to identify the RO that carried the strongest beam.

At 1116, the BS 1102 transmits a RACH Msg2 PDSCH that includes an indication of one or more beams. In some examples, the indication identifies a single beam (e.g., a single RO). In some examples, the indication identifies multiple beams (e.g., multiple ROs).

At 1118, the UE 1104 identifies the beam to use for the RACH Msg3 transmission based on the indication received at 1116. If the indication identifies a single beam, the UE 1104 selects that beam. If the indication identifies multiple beams, the UE 1104 selects one of those beams. The UE 1104 may select one of the beams based on one or more factors. In some examples, due to regulatory specific absorption rate (SAR) requirements, the UE 1104 may determine that certain panels (e.g., antenna panels that are currently close to a user's skin) should not be used or would need to be used with a reduced transmit power. Thus, the UE 1104 may elect to use a beam that does not rely on those panels or that relies less on those panels than another beam.

At 1120, the UE 1104 transmits the RACH Msg3 message using the beam identified at 1118.

Figure 12:
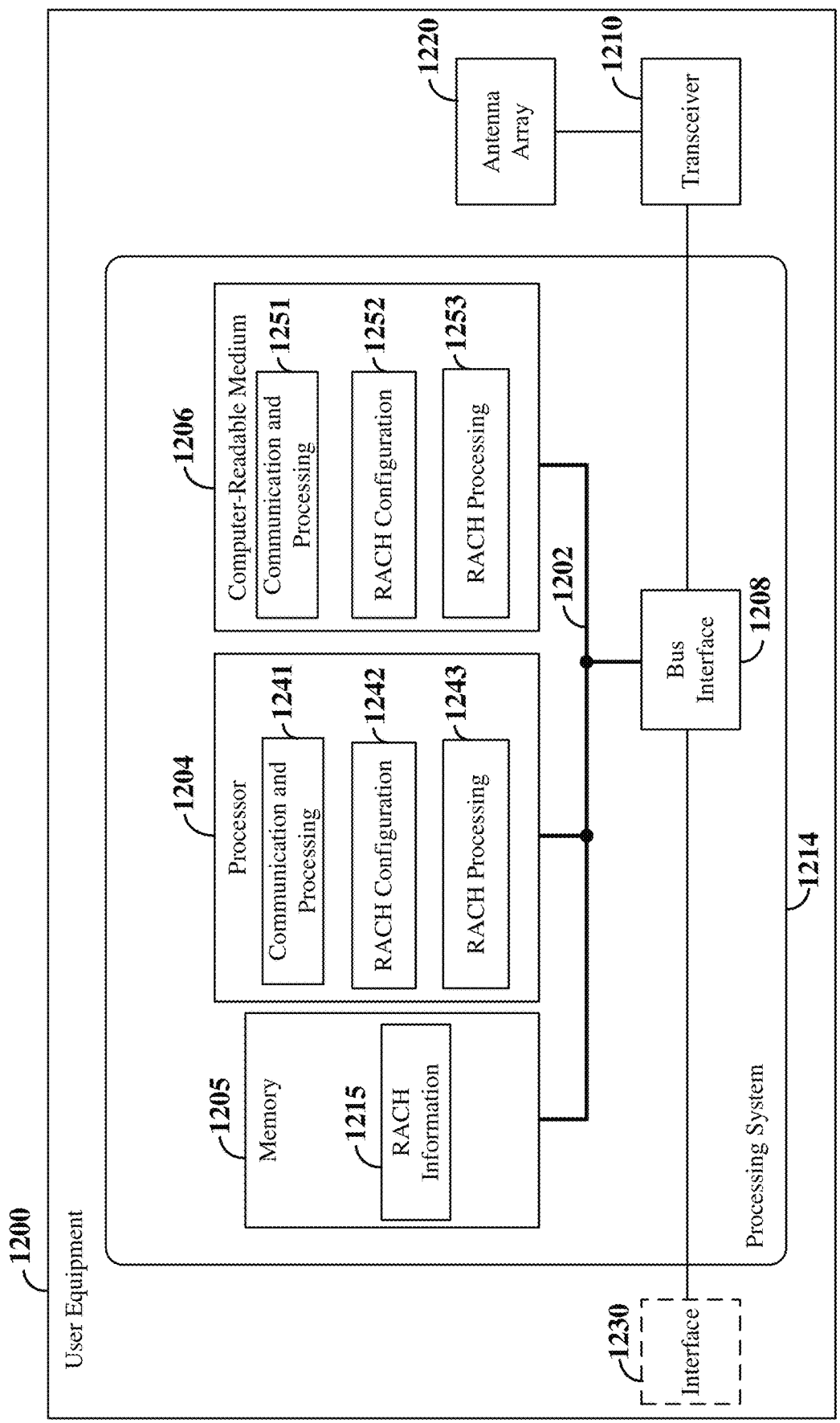
FIG. 12 is a block diagram illustrating an example of a hardware implementation for a user equipment employing a processing system according to some aspects.

FIG. 12 is a block diagram illustrating an example of a hardware implementation for a UE 1200 employing a processing system 1214. For example, the UE 1200 may be a device configured to wirelessly communicate with a base station, as discussed in any one or more of FIGS. 1-11. In some implementations, the UE 1200 may correspond to any of the UEs or scheduled entities shown in any of FIGS. 1, 2, 5, 6, 7, and 11.

In accordance with various aspects of the disclosure, an element, or any portion of an element, or any combination of elements may be implemented with the processing system 1214. The processing system 1214 may include one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1200 may be configured to perform any one or more of the functions described herein. That is, the processor 1204, as utilized in a UE 1200, may be used to implement any one or more of the processes and procedures described herein.

The processor 1204 may in some instances be implemented via a baseband or modem chip and in other implementations, the processor 1204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210 and between the bus 1202 and an interface 1230. The transceiver 1210 provides a communication interface or means for communicating with various other apparatus over a wireless transmission medium. In some examples, the UE may include two or more transceivers 1210. The interface 1230 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1230 may include a user interface (e.g., keypad, display, speaker, microphone, joystick). Of course, such a user interface is optional, and may be omitted in some examples, such as an IoT device.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may store RACH information 1215 (e.g., beam-related parameters) used by the processor 1204 in cooperation with the transceiver 1210 for transmitting and/or receiving RACH messages.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1200 may be configured to perform any one or more of the operations described herein (e.g., as described above in conjunction with FIGS. 1-11 and as described below in conjunction with FIGS. 13-15). In some aspects of the disclosure, the processor 1204, as utilized in the UE 1200, may include circuitry configured for various functions.

The processor 1204 may include communication and processing circuitry 1241. The communication and processing circuitry 1241 may be configured to communicate with a base station, such as a gNB. The communication and processing circuitry 1241 may include one or more hardware components that provide the physical structure that performs various processes related to wireless communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. In some examples, the communication and processing circuitry 1241 may include two or more transmit/receive chains, each configured to process signals in a different RAT (or RAN) type. The communication and processing circuitry 1241 may further be configured to execute communication and processing software 1251 included on the computer-readable medium 1206 to implement one or more functions described herein.

In some implementations where the communication involves receiving information, the communication and processing circuitry 1241 may obtain information from a component of the UE 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving. In some examples, the communication and processing circuitry 1241 may include functionality for a means for decoding.

In some implementations where the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., a means for transmitting). In some examples, the communication and processing circuitry 1241 may include functionality for a means for encoding.

In some examples, the communication and processing circuitry 1241 may include functionality for a means for receiving a synchronization signal block (SSB) transmission from a base station via a first plurality of beams. For example, the communication and processing circuitry 1241 and the transceiver 1210 may synchronize to the timing of a gNB based on the synchronization signals of the SSB. In addition, the communication and processing circuitry 1241 and the transceiver 1210 may obtain system information and other information for accessing the gNB.

The processor 1204 may include RACH configuration circuitry 1242 configured to perform RACH configuration-related operations as discussed herein (e.g., one or more of the operations described in conjunction with FIGS. 8-11). The RACH configuration circuitry 1242 may be configured to execute RACH configuration software 1252 included on the computer-readable medium 1206 to implement one or more functions described herein.

Figure 13:
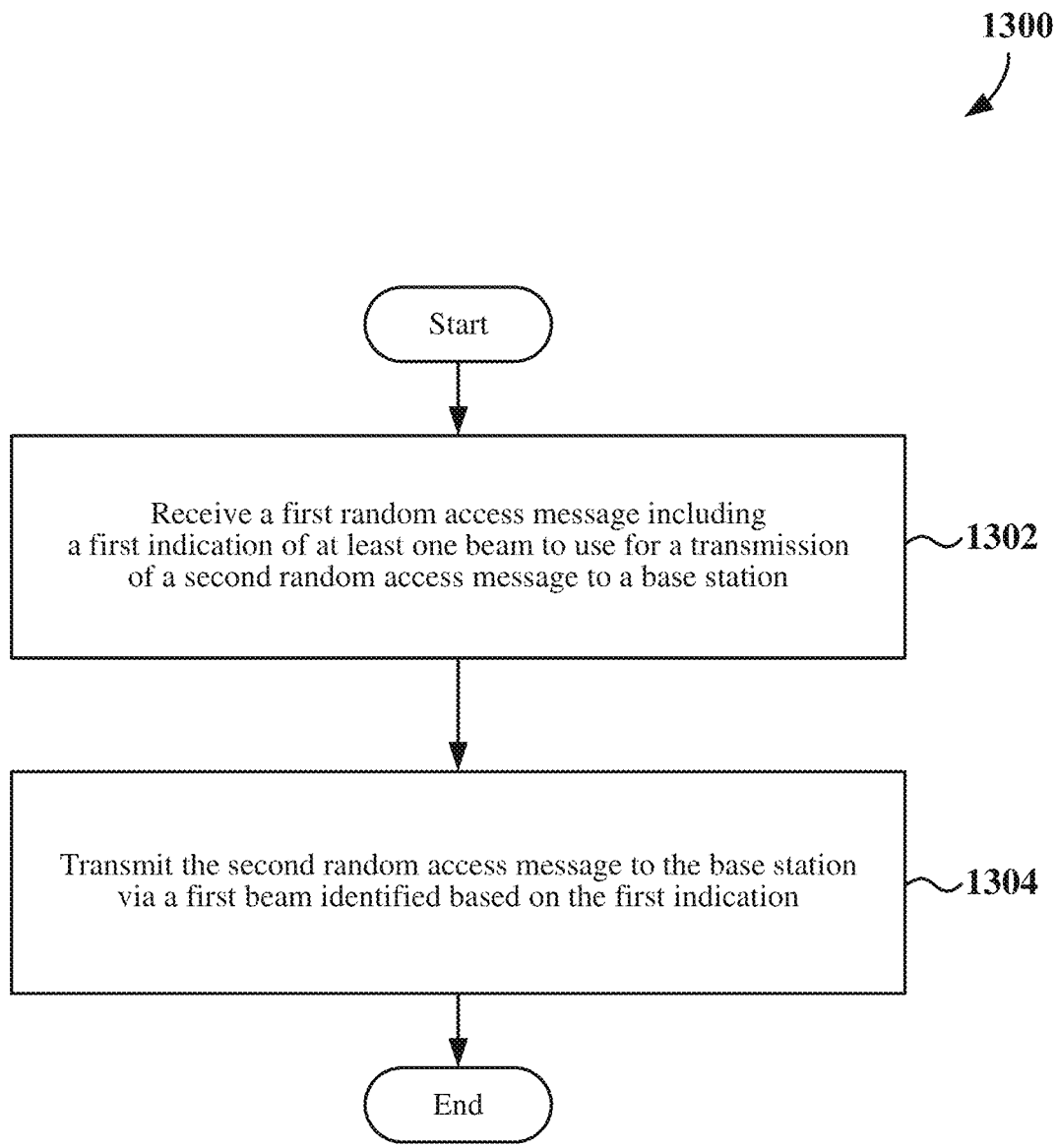
FIG. 13 is a flow chart of an example method for transmitting a random access message via an indicated beam according to some aspects.
Figure 14:
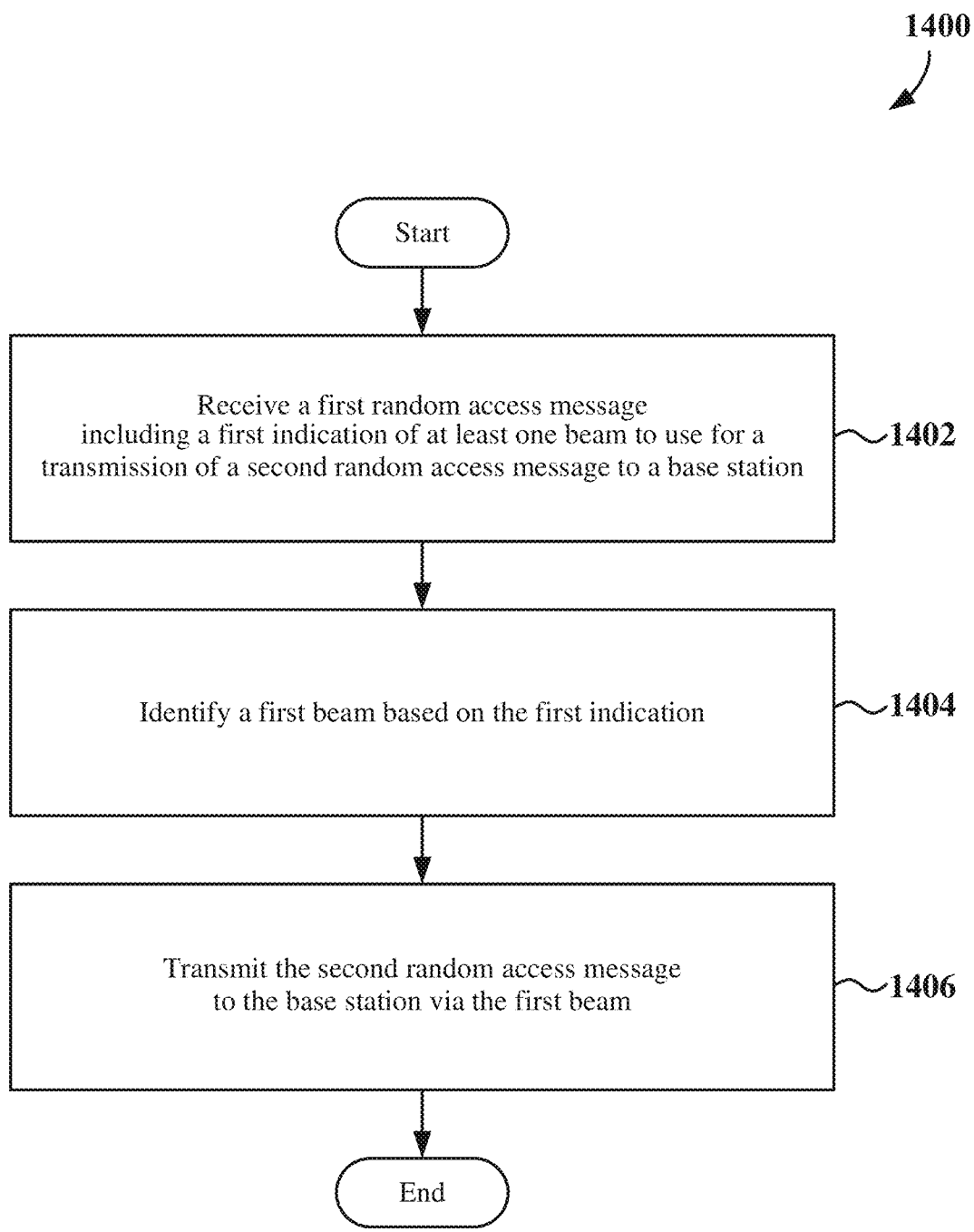
FIG. 14 is a flow chart of another example method for transmitting a random access message via an indicated beam according to some aspects.
Figure 15:
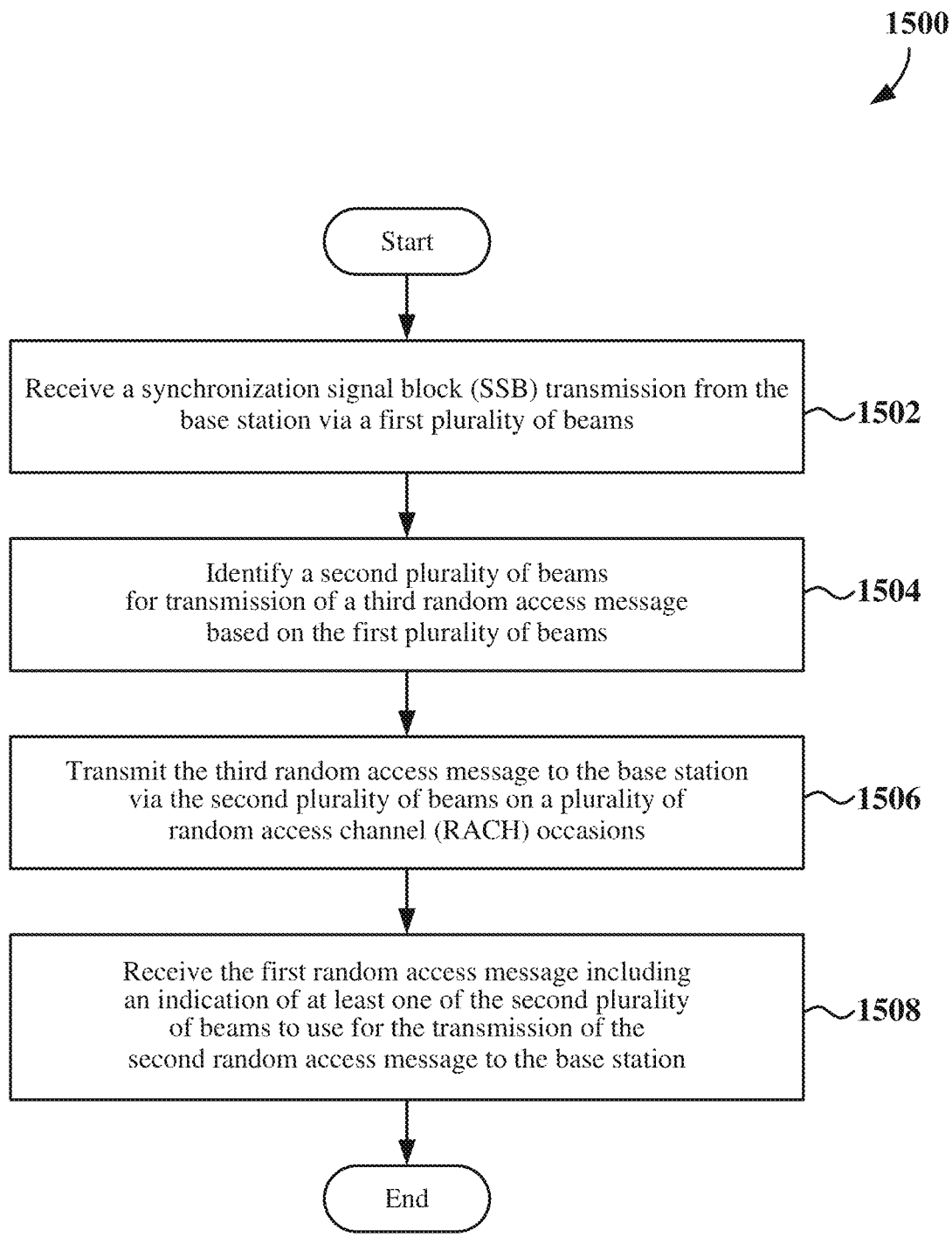
FIG. 15 is a flow chart of an example method for transmitting a PRACH via multiple beams according to some aspects.

The RACH configuration circuitry 1242 may include functionality for a means for identifying a beam (e.g., as described at block 908 of FIG. 9 and/or 1118 of FIG. 11 and/or block 1304 of FIG. 13 and/or block 1404 of FIG. 14 and/or block 1508 of FIG. 15). For example, the RACH configuration circuitry 1242 may parse a received RACH Msg2 PDSCH message for information to be used to transmit a RACH Msg3 message. This information may include a beam identifier or a RACH occasion identifier in some examples. In the latter case, the RACH configuration circuitry 1242 may determine which beam the UE used when transmitting on the identified RACH occasion. In some examples, the RACH configuration circuitry 1242 together with the communication and processing circuitry 1241 and the transceiver 1210 may obtain one or more RACH-related parameters (e.g., from RMSI and SIB2) from the SSB transmission. In some examples, the RACH configuration circuitry 1242 together with the communication and processing circuitry 1241 and the transceiver 1210 may perform a beam sweep operation (e.g., as described in conjunction with FIG. 7) to identify the best SSB receive beams. In addition, the RACH configuration circuitry 1242 may identify a set of transmit beams to use for a PRACH transmission from the SSB receive beams (e.g., as described in conjunction with FIG. 7).

The processor 1204 may include RACH processing circuitry 1243 configured to perform RACH processing-related operations as discussed herein (e.g., one or more of the operations described in conjunction with FIGS. 8-11). The RACH processing circuitry 1243 may be configured to execute RACH processing software 1253 included on the computer-readable medium 1206 to implement one or more functions described herein.

The RACH processing circuitry 1243 may include functionality for a means for receiving a random access message (e.g., as described at block 908 of FIG. 9 and/or 1116 of FIG. 11 and/or block 1302 of FIG. 13 and/or block 1402 of FIG. 14 and/or block 1508 of FIG. 15). For example, the RACH processing circuitry 1243 together with the communication and processing circuitry 1241 and the transceiver 1210 may monitor a PDCCH channel for a DCI from a gNB, parse the DCI to determine the resources to be used by the gNB for transmitting a RACH Msg2 PDSCH message, and monitor those resources for the RACH Msg2 PDSCH message. In some examples, the RACH processing circuitry 1243 may parse the RACH Msg2 PDSCH message for information to be used to transmit a RACH Msg3 message.

The RACH processing circuitry 1243 may include functionality for a means for transmitting a random access message (e.g., as described at block 910 of FIG. 9 and/or 1120 of FIG. 11 and/or block 1304 of FIG. 13 and/or block 1406 of FIG. 14). For example, the RACH processing circuitry 1243 may determine from the RACH Msg2 PDSCH message the resource to be used to transmit a RACH Msg3 message. The RACH processing circuitry 1243 together with the communication and processing circuitry 1241 and the transceiver 1210 may then transmit the RACH Msg3 message on the specified resource using a beam identified by the RACH configuration circuitry 1242. In some examples, the RACH processing circuitry 1243 may identify the RACH occasions specified (e.g., in SIB2) for transmission of a RACH Msg1 message. In addition, the RACH processing circuitry 1243 together with the communication and processing circuitry 1241 and the transceiver 1210 may generate repetitions of a RACH Msg1 message and transmit these repetitions to a gNB via the RACH occasions.

FIG. 13 is a flow chart illustrating an example method 1300 for wireless communication according to some aspects of the disclosure. As described herein, some or all illustrated features may be omitted in a particular implementation within the scope of the present disclosure, and some illustrated features may not be required for implementation of all examples. In some examples, the method 1300 may be carried out by the UE 1200 illustrated in FIG. 12. In some examples, the method 1300 may be carried out by any suitable apparatus or means for carrying out the functions or algorithm described below.

At block 1302, a user equipment may receive a first random access message including a first indication of at least one beam to use for a transmission of a second random access message to a base station. For example, the RACH processing circuitry 1243 together with the communication and processing circuitry 1241 and the transceiver 1210, shown and described above in connection with FIG. 12, may provide a means to receive a first random access message including a first indication of at least one beam to use for a transmission of a second random access message to a base station.

At block 1304, the user equipment may transmit the second random access message to the base station via a first beam identified based on the first indication. For example, the RACH processing circuitry 1243 together with the communication and processing circuitry 1241 and the transceiver 1210, shown and described above in connection with FIG. 12, may provide a means to transmit the second random access message to the base station via a first beam identified based on the first indication.

In some examples, the first indication identifies the first beam. In some examples, the first indication identifies a specific random access channel (RACH) occasion associated with the first beam. In some examples, the first indication identifies a specific physical random access channel (PRACH) repetition associated with the first beam.

In some examples, the first random access message may include a random access response (RAR) message or a random access channel (RACH) Msg2 physical downlink shared channel (PDSCH) message. In some examples, the second random access message may include a RACH radio resource control (RRC) connection request message or a RACH Msg3 message.

In some examples, the first indication identifies a specific random access channel (RACH) occasion associated with the first beam. In some examples, to identify the first beam based on the first indication, the user equipment may identify the first beam based on the specific RACH occasion.

In some examples, the at least one beam is the first beam. In some examples, the at least one beam may include a plurality of beams and, to identify the first beam based on the first indication, the user equipment may select the first beam from the plurality of beams based on at least one factor. In some examples, the at least one factor may include at least one of a maximum transmit power associated with the first beam, a location of an antenna panel used to transmit the first beam, a regulatory specific absorption rate (SAR), or a combination thereof.

In some examples, the user equipment may identify a first plurality of beams for transmission of a third random access message, and transmit the third random access message to the base station via the first plurality of beams on a plurality of random access channel (RACH) occasions.

In some examples, to transmit the third random access message to the base station via the first plurality of beams on the plurality of RACH occasions, the user equipment may transmit a first repetition of the third random access message via a second beam of the first plurality of beams on a first RACH occasion of the plurality of RACH occasions, and transmit a second repetition of the third random access message via a third beam of the first plurality of beams on a second RACH occasion of the plurality of RACH occasions. In some examples, the third beam has a different direction than the second beam.

In some examples, to transmit the third random access message to the base station via the first plurality of beams on the plurality of RACH occasions, the user equipment may transmit a first repetition of the third random access message via a second beam of the first plurality of beams on a first set of symbols of a first RACH occasion of the plurality of RACH occasions, and transmit a second repetition of the third random access message via a third beam of the first plurality of beams on a second set of symbols of the first RACH occasion. In some examples, the third beam has a different direction than the second beam.

In some examples, the user equipment may receive a synchronization signal block (SSB) transmission from the base station via a second plurality of beams. In some examples, to identify the first plurality of beams, the user equipment may select at least two beams based on the second plurality of beams.

In some examples, the user equipment may receive a second indication to transmit the third random access message via a specified number of beams. In some examples, the identification of the first plurality of beams may include selecting the specified number of beams. In some examples, the user equipment may receive remaining system information (RMSI) that includes the second indication from the base station.

In some examples, the user equipment may receive a second indication to transmit the third random access message via multiple beams. In some examples, the transmission of the third random access message via the first plurality of beams on the plurality of RACH occasions is triggered by the second indication. In some examples, the user equipment may receive remaining system information (RMSI) that includes the second indication from the base station.

In some examples, the user equipment may measure a signal from the base station to provide a signal measurement value, and determine that the signal measurement value is greater than a threshold. In some examples, the transmission of the third random access message via the first plurality of beams on the plurality of RACH occasions is triggered by the determination that the signal measurement value is greater than the threshold. In some examples, to measure the signal from the base station to provide the signal measurement value, the user equipment may measure a received reference signal power (RSRP) of a synchronization signal block (SSB) transmission.

In some examples, the user equipment may receive a second indication of a first physical random access channel (PRACH) preamble sequence to use for PRACH beam sweeping. In some examples, the transmission of the third random access message may include transmitting the first PRACH preamble sequence. In some examples, the user equipment may receive a third indication of a second PRACH preamble sequence for transmission of the third random access message without PRACH beam sweeping, wherein the second PRACH preamble sequence is different from the first PRACH preamble sequence.

FIG. 14 is a flow chart illustrating an example method 1400 for wireless communication according to some aspects of the disclosure. As described herein, some or all illustrated features may be omitted in a particular implementation within the scope of the present disclosure, and some illustrated features may not be required for implementation of all examples. In some examples, the method 1400 may be carried out by the UE 1200 illustrated in FIG. 12. In some examples, the method 1400 may be carried out by any suitable apparatus or means for carrying out the functions or algorithm described below.

At block 1402, a user equipment may receive a first random access message including a first indication of at least one beam to use for a transmission of a second random access message to a base station. For example, the RACH processing circuitry 1243 together with the communication and processing circuitry 1241 and the transceiver 1210, shown and described above in connection with FIG. 12, may provide a means to receive a first random access message including a first indication of at least one beam to use for a transmission of a second random access message to a base station.

At block 1404, the user equipment may identify a first beam based on the first indication. For example, the RACH configuration circuitry 1242 may provide a means to identify a first beam based on the first indication.

At block 1406, the user equipment may transmit the second random access message to the base station via the first beam. For example, the RACH processing circuitry 1243 together with the communication and processing circuitry 1241 and the transceiver 1210, shown and described above in connection with FIG. 12, may provide a means to transmit the second random access message to the base station via the first beam.

In some examples, the first random access message may include a random access response (RAR) message or a random access channel (RACH) Msg2 physical downlink shared channel (PDSCH) message. In some examples, the second random access message may include a RACH radio resource control (RRC) connection request message or a RACH Msg3 message.

In some examples, the first indication identifies a specific random access channel (RACH) occasion associated with the first beam. In some examples, identifying the first beam based on the first indication may include identifying the first beam based on the specific RACH occasion.

In some examples, the at least one beam is the first beam. In some examples, the at least one beam may include a plurality of beams, and identifying the first beam based on the first indication may include selecting the first beam from the plurality of beams based on at least one factor. In some examples, the at least one factor may include at least one of a maximum transmit power associated with the first beam, a location of an antenna panel used to transmit the first beam, a regulatory specific absorption rate (SAR), or a combination thereof.

In some examples, the user equipment may identify a first plurality of beams for transmission of a third random access message, and transmit the third random access message to the base station via the first plurality of beams on a plurality of random access channel (RACH) occasions.

In some examples, to transmit the third random access message to the base station via the first plurality of beams on the plurality of RACH occasions, the user equipment may transmit a first repetition of the third random access message via a second beam of the first plurality of beams on a first RACH occasion of the plurality of RACH occasions, and transmit a second repetition of the third random access message via a third beam of the first plurality of beams on a second RACH occasion of the plurality of RACH occasions. In some examples, the third beam has a different direction than the second beam.

In some examples, to transmit the third random access message to the base station via the first plurality of beams on the plurality of RACH occasions, the user equipment may transmit a first repetition of the third random access message via a second beam of the first plurality of beams on a first set of symbols of a first RACH occasion of the plurality of RACH occasions, and transmit a second repetition of the third random access message via a third beam of the first plurality of beams on a second set of symbols of the first RACH occasion. In some examples, the third beam has a different direction than the second beam.

In some examples, the user equipment may receive a synchronization signal block (SSB) transmission from the base station via a second plurality of beams. In some examples, to identify the first plurality of beams, the user equipment may select at least two beams based on the second plurality of beams.

In some examples, the user equipment may receive a second indication to transmit the third random access message via a specified number of beams. In some examples, to identify the first plurality of beams, the user equipment may select the specified number of beams. In some examples, to receive the second indication, the user equipment may receive remaining system information (RMSI) that includes the second indication from the base station.

In some examples, the user equipment may receive a second indication to transmit the third random access message via multiple beams. In some examples, the transmission of the third random access message via the first plurality of beams on the plurality of RACH occasions is triggered by the second indication. In some examples, to receive the second indication, the user equipment may receive remaining system information (RMSI) that includes the second indication from the base station.

In some examples, the user equipment may measure a signal from the base station to provide a signal measurement value, and determine that the signal measurement value is greater than a threshold. In some examples, the transmission of the third random access message via the first plurality of beams on the plurality of RACH occasions is triggered by the determining that the signal measurement value is greater than the threshold. In some examples, to measure the signal from the base station to provide the signal measurement value, the user equipment may measure a received reference signal power (RSRP) of a synchronization signal block (SSB) transmission.

In some examples, the user equipment may receive a second indication of a first physical random access channel (PRACH) preamble sequence to use for PRACH beam sweeping. In some examples, to transmit the third random access message, the user equipment may transmit the first PRACH preamble sequence. In some examples, the user equipment may receive a third indication of a second PRACH preamble sequence for transmission of the third random access message without PRACH beam sweeping, wherein the second PRACH preamble sequence is different from the first PRACH preamble sequence.

FIG. 15 is a flow chart illustrating an example method 1500 for wireless communication according to some aspects of the disclosure. In some examples, the method 1500 may be used in conjunction with (e.g., in addition to or as part of) the method 1300 of FIG. 13 and/or the method 1400 of FIG. 14. As described herein, some or all illustrated features may be omitted in a particular implementation within the scope of the present disclosure, and some illustrated features may not be required for implementation of all examples. In some examples, the method 1500 may be carried out by the UE 1200 illustrated in FIG. 12. In some examples, the method 1500 may be carried out by any suitable apparatus or means for carrying out the functions or algorithm described below.

At block 1502, a user equipment may receive a synchronization signal block (SSB) transmission from the base station via a first plurality of beams. For example, the communication and processing circuitry 1241 and the transceiver 1210 may provide a means to receive a synchronization signal block (SSB) transmission from the base station via a first plurality of beams.

At block 1504, the user equipment may identify a second plurality of beams for transmission of a third random access message based on the first plurality of beams. For example, the RACH configuration circuitry 1242 together with the communication and processing circuitry 1241 and the transceiver 1210 may provide a means to identify a second plurality of beams for transmission of a third random access message based on the first plurality of beams.

At block 1506, the user equipment may transmit the third random access message to the base station via the second plurality of beams on a plurality of random access channel (RACH) occasions. For example, the RACH processing circuitry 1243 may provide a means to transmit the third random access message to the base station via the second plurality of beams on a plurality of random access channel (RACH) occasions.

At block 1508, the user equipment may receive the first random access message including an indication of at least one of the second plurality of beams to use for the transmission of the second random access message to the base station. For example, the RACH processing circuitry 1243 together with the communication and processing circuitry 1241 and the transceiver 1210 may provide a means to receive the first random access message including an indication of at least one of the second plurality of beams to use for the transmission of the second random access message to the base station.

In one configuration, the UE 1200 includes means for receiving a first random access message including a first indication of at least one beam to use for a transmission of a second random access message to a base station, and means for transmitting the second random access message to the base station via a first beam identified based on the first indication. In one aspect, the aforementioned means may be the processor 1204 shown in FIG. 12 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable medium 1206, or any other suitable apparatus or means described in any one or more of FIGS. 1, 2, 5, 6, 7, 11, and 12, and utilizing, for example, the methods and/or algorithms described herein in relation to FIGS. 13-15.

Figure 16:
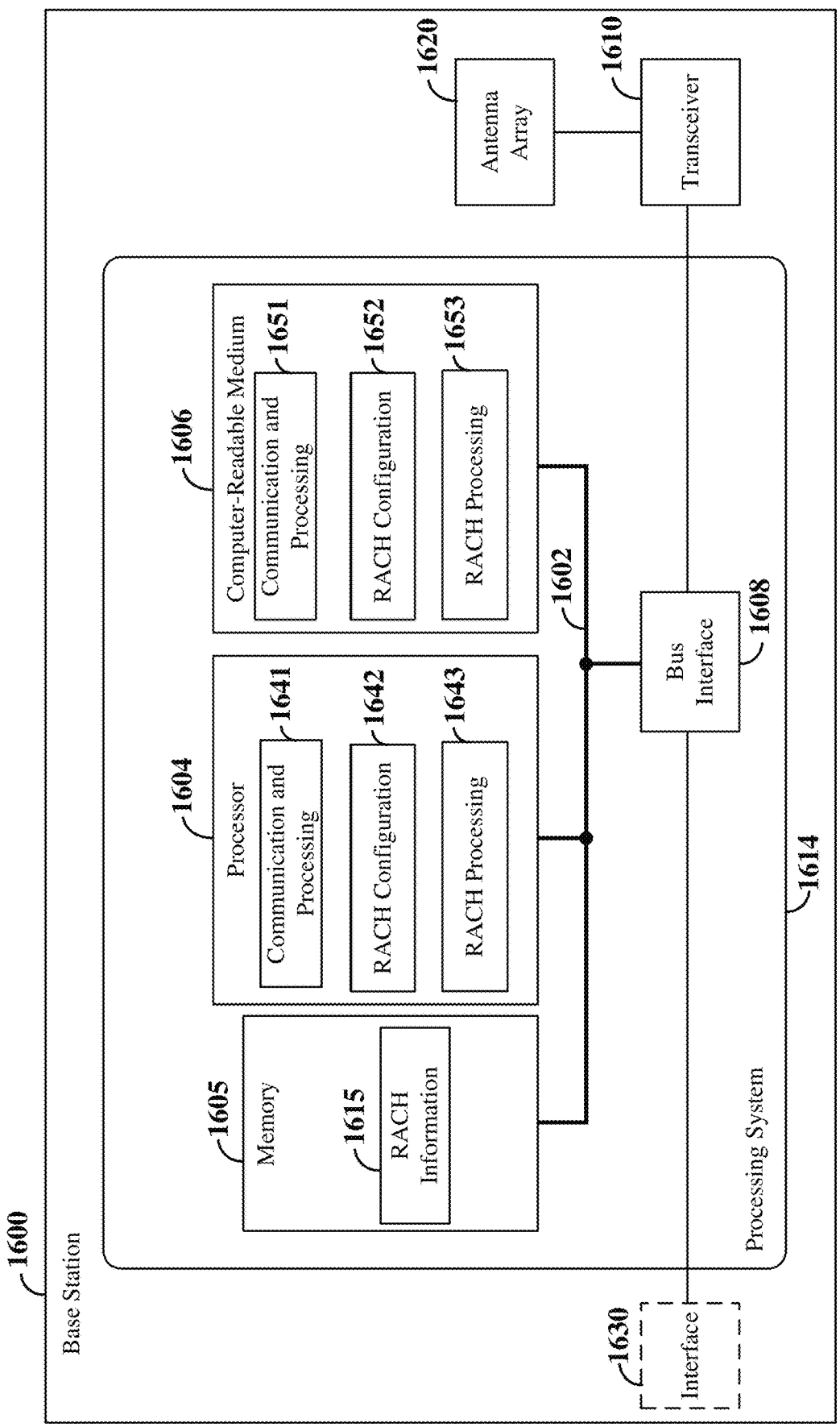
FIG. 16 is a block diagram illustrating an example of a hardware implementation for a base station employing a processing system according to some aspects.

FIG. 16 is a conceptual diagram illustrating an example of a hardware implementation for base station (BS) 1600 employing a processing system 1614. In some implementations, the BS 1600 may correspond to any of the BSs (e.g., gNBs) or scheduling entities shown in any of FIGS. 1, 2, 5, 6, 7, and 11.

In accordance with various aspects of the disclosure, an element, or any portion of an element, or any combination of elements may be implemented with the processing system 1614. The processing system may include one or more processors 1604. The processing system 1614 may be substantially the same as the processing system 1214 illustrated in FIG. 12, including a bus interface 1608, a bus 1602, memory 1605, a processor 1604, and a computer-readable medium 1606. The memory 1605 may store RACH information 1615 (e.g., beam-related parameters) used by the processor 1604 in cooperation with the transceiver 1610 for transmitting and/or receiving RACH messages. Furthermore, the BS 1600 may include an interface 1630 (e.g., a network interface) that provides a means for communicating with at least one other apparatus within a core network and with at least one radio access network.

The BS 1600 may be configured to perform any one or more of the operations described herein (e.g., as described above in conjunction with FIGS. 1-11 and as described below in conjunction with FIGS. 17-19). In some aspects of the disclosure, the processor 1604, as utilized in the BS 1600, may include circuitry configured for various functions.

The processor 1604 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from multiple UEs.

The processor 1604 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources. The processor 1604 may further be configured to schedule resources for the uplink transmission of uplink reference signals (e.g., SRSs) on a plurality of uplink beams for an uplink beam sweep in accordance with a selected beam sweep type and selected number of uplink reference signal resources.

The processor 1604 may further be configured to schedule resources for the transmission of an uplink signal. The processor 1604 may be configured to schedule uplink resources that may be utilized by the UE to transmit an uplink message (e.g., a PUCCH, a PUSCH, a PRACH occasion, or an RRC message). In some examples, the processor 1604 may be configured to schedule uplink resources in response to receiving a scheduling request from the UE. In some examples, the uplink resources may be associated with one or more uplink transmit beams and one or more corresponding receive beams applied to the uplink signal (e.g., based on the uplink BPLs). In some examples, the resources may be associated with a number of uplink transmit beams to be utilized for the uplink signal and/or a number of repetitions of the uplink signal.

In some aspects of the disclosure, the processor 1604 may include communication and processing circuitry 1641. The communication and processing circuitry 1644 may be configured to communicate with a UE. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

In some implementations wherein the communication involves receiving information, the communication and processing circuitry 1641 may obtain information from a component of the BS 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving. In some examples, the communication and processing circuitry 1641 may include functionality for a means for decoding.

In some implementations wherein the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., a means for transmitting). In some examples, the communication and processing circuitry 1641 may include functionality for a means for encoding.

The processor 1604 may include RACH configuration circuitry 1642 configured to perform RACH configuration-related operations as discussed herein (e.g., one or more of the operations described in conjunction with FIGS. 8-11). The RACH configuration circuitry 1642 may be configured to execute RACH configuration software 1652 included on the computer-readable medium 1606 to implement one or more functions described herein.

Figure 17:
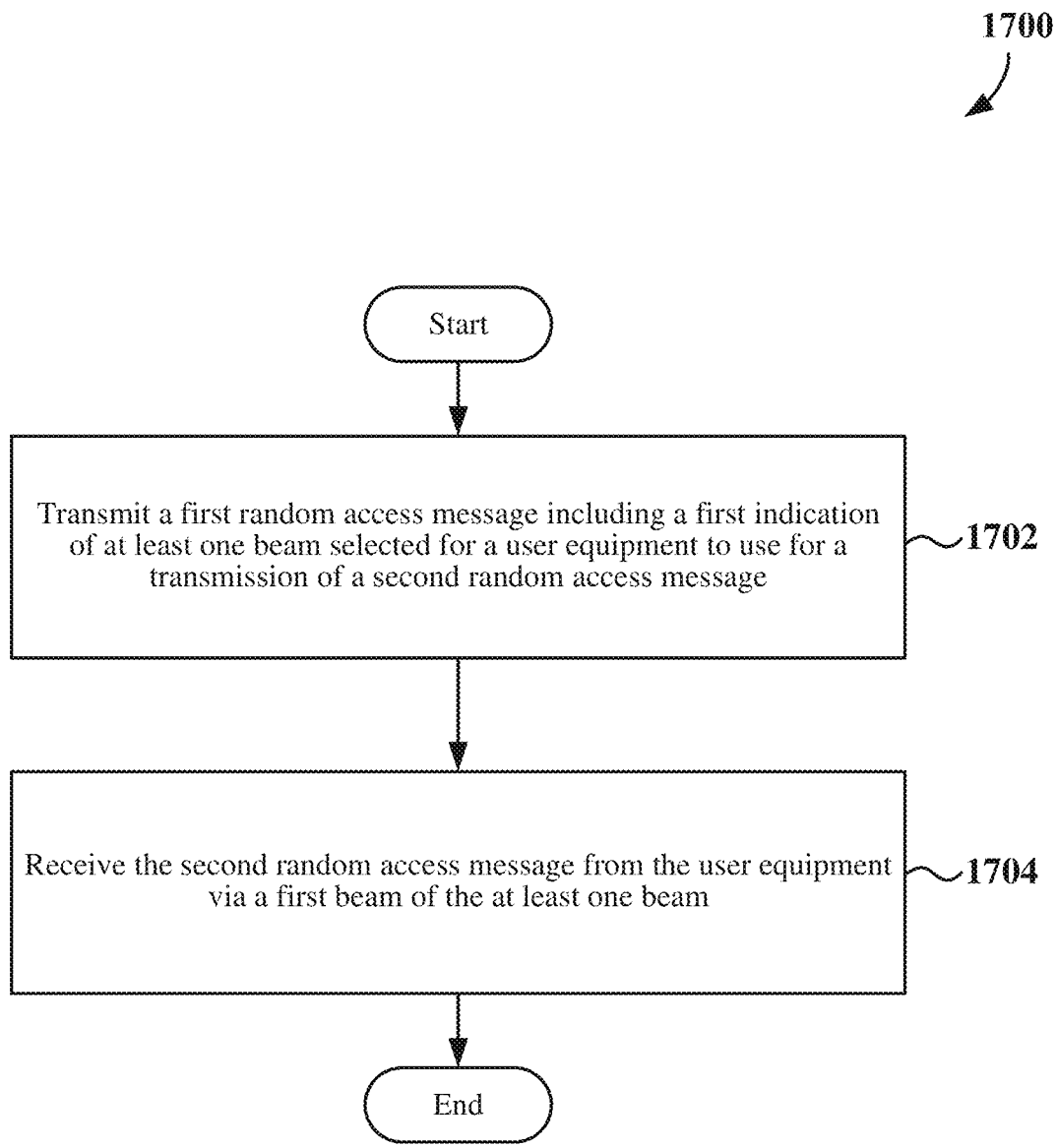
FIG. 17 is a flow chart illustrating an example of a method for indicating a beam for transmission of a random access message according to some aspects.
Figure 18:
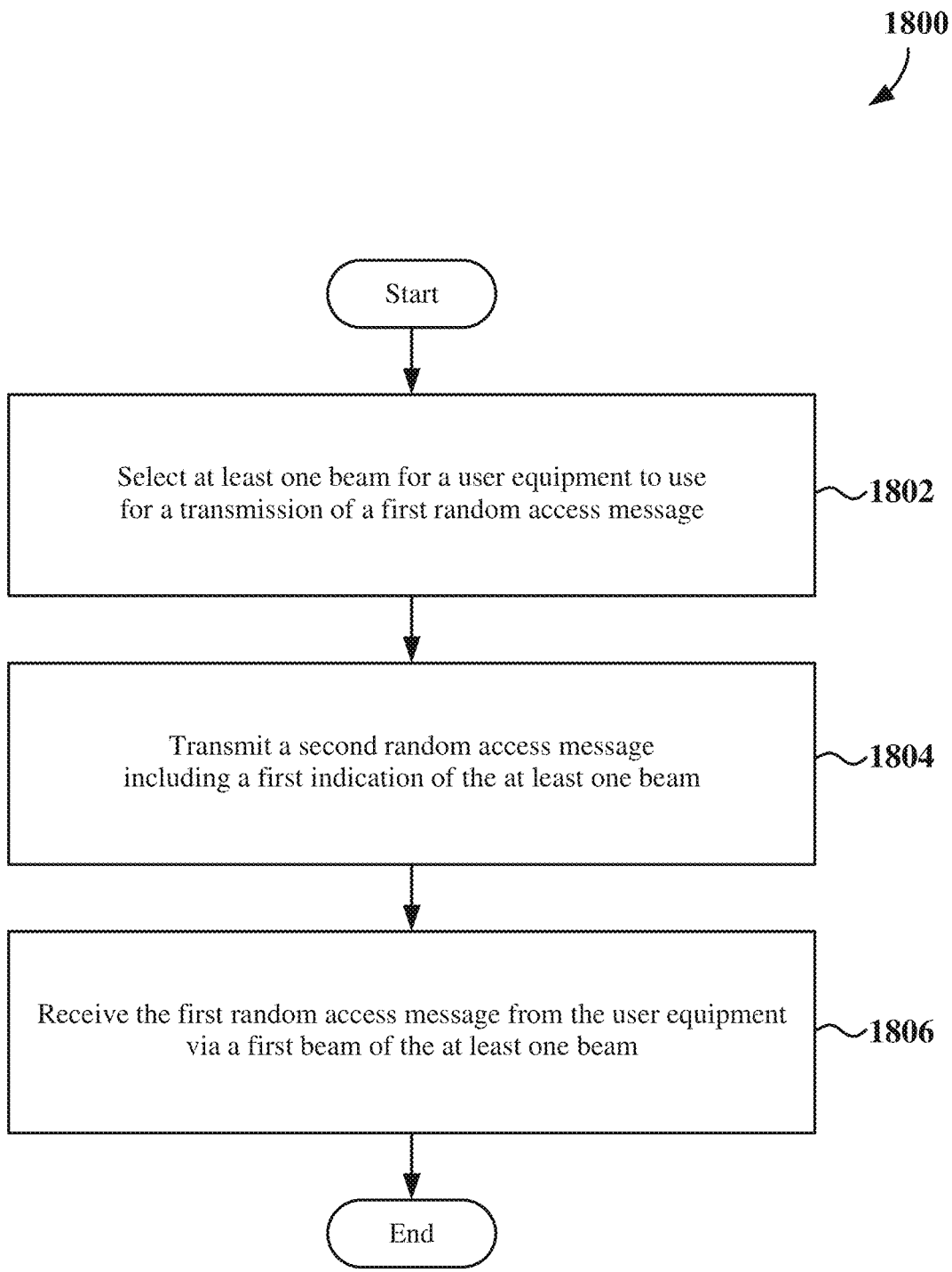
FIG. 18 is a flow chart illustrating another example of a method for indicating a beam for transmission of a random access message according to some aspects.
Figure 19:
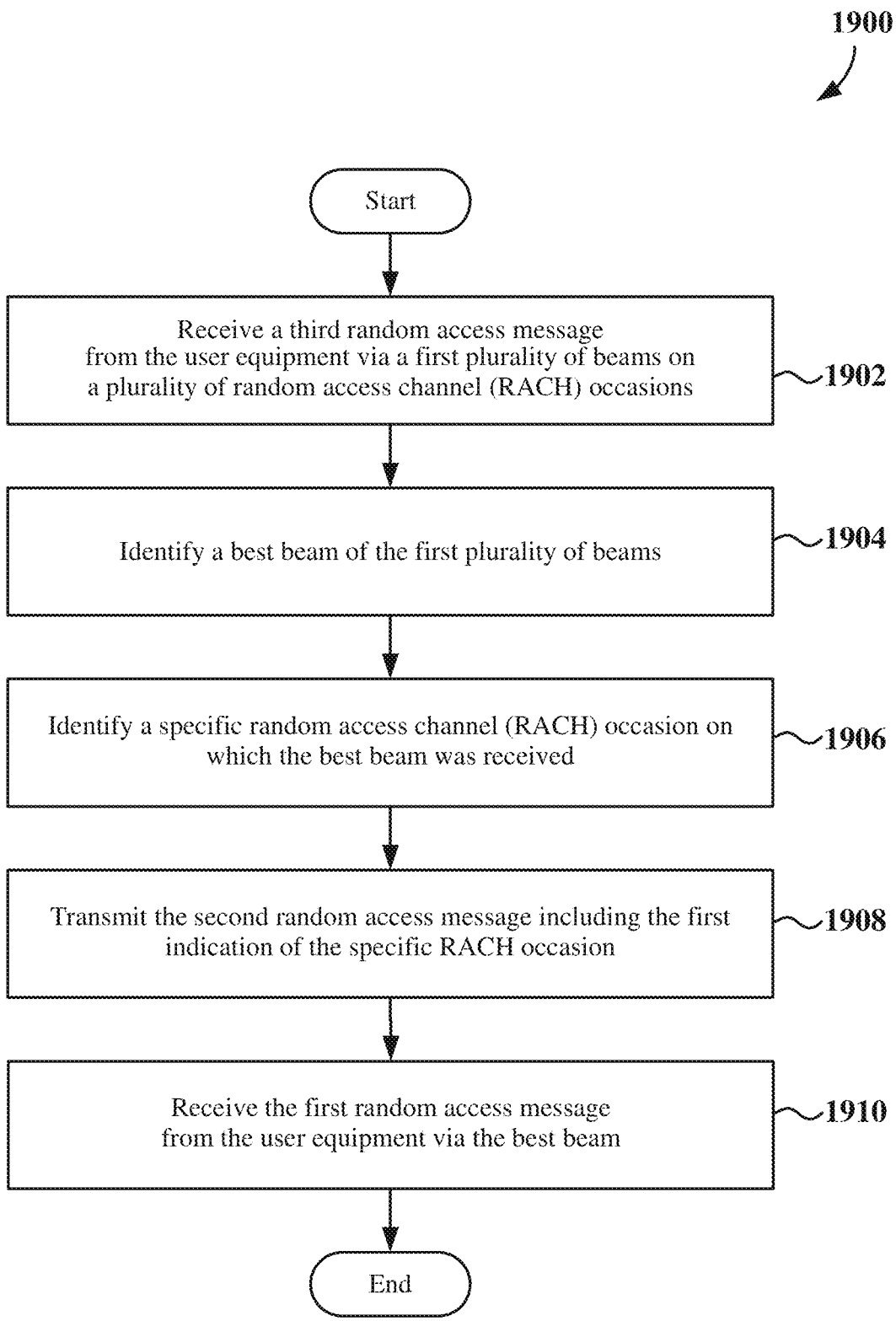
FIG. 19 is a flow chart illustrating an example of a method for identifying a RACH occasion for transmission of a random access message according to some aspects.

The RACH configuration circuitry 1642 may include functionality for a means for selecting a beam (e.g., as described at block 1008 of FIG. 10 and/or 1114 of FIG. 11 and/or block 1702 of FIG. 17 and/or block 1802 of FIG. 18 and/or block 1904 of FIG. 19). For example, the RACH configuration circuitry 1642 together with the communication and processing circuitry 1641 and the transceiver 1610 may measure the signal power received from a UE during each RACH occasion and thereby determine the RACH occasion (and, hence, the PRACH beam) with the highest received power. The RACH configuration circuitry 1642 may then select that RACH occasion or beam to be indicated to the UE.

The RACH configuration circuitry 1642 may include functionality for a means for identify a specific random access channel (RACH) occasion on which the best beam was received. For example, the RACH configuration circuitry 1642 may generate an indication of the RACH occasion on which the beam with the highest received signal power was received.

The processor 1604 may include RACH processing circuitry 1643 configured to perform RACH processing-related operations as discussed herein (e.g., one or more of the operations described in conjunction with FIGS. 8-11). The RACH processing circuitry 1643 may be configured to execute RACH processing software 1653 included on the computer-readable medium 1606 to implement one or more functions described herein.

The RACH processing circuitry 1643 may include functionality for a means for receiving a random access message (e.g., as described at block 1012 of FIG. 10 and/or 1112 of FIG. 11 and/or 1120 of FIG. 11 and/or block 1704 of FIG. 17 and/or block 1806 of FIG. 18 and/or block 1910 of FIG. 19). For example, the RACH processing circuitry 1643 together with the communication and processing circuitry 1641 and the transceiver 1610 may monitor resources scheduled by the BS 1600 for a RACH Msg3 transmission by a UE. Upon successfully decoding information received on these resources, the RACH processing circuitry 1643 may extract connection request information and/or other information sent by the UE. In some examples, the RACH processing circuitry 1643 together with the communication and processing circuitry 1641 and the transceiver 1610 may monitor RACH occasions specified for a UE for repetitions of a RACH Msg1 message. The RACH processing circuitry 1643 may then combine (e.g., soft combine) the repetitions, followed by decoding and CRC checking, to detect the RACH Msg1 message from the combined repetitions.

The RACH processing circuitry 1643 may include functionality for a means for transmitting a random access message (e.g., as described at block 1010 of FIG. 10 and/or 1116 of FIG. 11 and/or block 1702 of FIG. 17 and/or block 1804 of FIG. 18 and/or block 1908 of FIG. 19). For example, the RACH processing circuitry 1643 together with the communication and processing circuitry 1641 and the transceiver 1610 may generate and transmit a RACH Msg2 to a UE. In some examples, this involves transmitting a DCI that schedules a RACH Msg2 PDSCH transmission and then transmitting a RACH Msg2 PDSCH transmission that includes an indication of a RACH occasion (e.g., on which the best PRACH beam was sent) or a particular beam.

FIG. 17 is a flow chart illustrating an example method 1700 for wireless communication according to some aspects of the disclosure. As described herein, some or all illustrated features may be omitted in a particular implementation within the scope of the present disclosure, and some illustrated features may not be required for implementation of all examples. In some examples, the method 1700 may be carried out by the BS 1600 illustrated in FIG. 16. In some examples, the method 1700 may be carried out by any suitable apparatus or means for carrying out the functions or algorithm described below.

At block 1702, a base station may transmit a first random access message including a first indication of least one beam selected for a user equipment to use for a transmission of a second random access message. For example, the RACH processing circuitry 1643 together with the communication and processing circuitry 1641 and the transceiver 1610, shown and described above in connection with FIG. 16, may provide a means to transmit a first random access message including a first indication of least one beam selected for a user equipment to use for a transmission of a second random access message.

At block 1704, the base station may receive the second random access message from the user equipment via a first beam of the at least one beam. For example, the RACH processing circuitry 1643 together with the communication and processing circuitry 1641 and the transceiver 1610, shown and described above in connection with FIG. 16, may provide a means to receive the second random access message from the user equipment via a first beam of the at least one beam.

In some examples, the first indication identifies the first beam. In some examples, the first indication identifies a specific random access channel (RACH) occasion associated with the first beam. In some examples, the first indication identifies a specific physical random access channel (PRACH) repetition associated with the first beam.

In some examples, the first random access message may include a random access channel (RACH) radio resource control (RRC) connection request message or a RACH Msg3 message. In some examples, the second random access message may include a random access response (RAR) message or a RACH Msg2 physical downlink shared channel (PDSCH) message.

In some examples, the selection of the at least one beam may include identifying a best beam of a plurality of physical random access channel (PRACH) beams transmitted by the user equipment. In some examples, the base station may identify a specific random access channel (RACH) occasion on which the best beam was received. In some examples, the first indication identifies the specific RACH occasion.

In some examples, the at least one beam is the first beam. In some examples, the at least one beam may include a plurality of beams.

In some examples, the base station may receive a third random access message from the user equipment via a first plurality of beams on a plurality of random access channel (RACH) occasions. In some examples, to receive the third random access message, the base station may combine repetitions of the third random access message received via the first plurality of beams on the plurality of RACH occasions.

In some examples, to receive the third random access message, the base station may receive a first repetition of the third random access message via a second beam of the first plurality of beams on a first RACH occasion of the plurality of RACH occasions, and receive a second repetition of the third random access message via a third beam of the first plurality of beams on a second RACH occasion of the plurality of RACH occasions. In some examples, the third beam has a different direction than the second beam.

In some examples, to receive the third random access message, the base station may receive a first repetition of the third random access message via a second beam of the first plurality of beams on a first set of symbols of a first RACH occasion of the plurality of RACH occasions, and receive a second repetition of the third random access message via a third beam of the first plurality of beams on a second set of symbols of the first RACH occasion. In some examples, the third beam has a different direction than the second beam.

In some examples, the base station may transmit a synchronization signal block (SSB) via a second plurality of beams. In some examples, the first plurality of beams is based on the second plurality of beams.

In some examples, the base station may select a specified number of beams for the user equipment to use for transmission of the third random access message, and transmit a second indication of the specified number of beams. In some examples, the transmission of the second indication may include transmitting remaining system information (RMSI) that includes the second indication.

In some examples, the base station may transmit a second indication specifying that the user equipment is to transmit the third random access message via multiple beams. In some examples, the transmission of the second indication may include transmitting remaining system information (RMSI) that includes the second indication.

In some examples, the base station may define a first physical random access channel (PRACH) preamble sequence for PRACH transmissions with beam sweeping, and define a second physical random access channel (PRACH) preamble sequence for PRACH transmissions without beam sweeping, wherein the second PRACH preamble sequence is different from the first PRACH preamble sequence. In some examples, the base station may transmit a second indication of the first PRACH preamble sequence to the user equipment. In some examples, the receipt of the third random access message may include receiving the first PRACH preamble sequence via the first plurality of beams on the plurality of RACH occasions after transmitting the second indication.

FIG. 18 is a flow chart illustrating an example method 1800 for wireless communication according to some aspects of the disclosure. As described herein, some or all illustrated features may be omitted in a particular implementation within the scope of the present disclosure, and some illustrated features may not be required for implementation of all examples. In some examples, the method 1800 may be carried out by the BS 1600 illustrated in FIG. 16. In some examples, the method 1800 may be carried out by any suitable apparatus or means for carrying out the functions or algorithm described below.

At block 1802, a base station may select at least one beam for a user equipment to use for a transmission of a first random access message. For example, the RACH configuration circuitry 1642 together with the communication and processing circuitry 1641 and the transceiver 1610, shown and described above in connection with FIG. 16, may provide a means to select at least one beam for a user equipment to use for a transmission of a first random access message.

At block 1804, the base station may transmit a second random access message including a first indication of the at least one beam. For example, the RACH processing circuitry 1643 together with the communication and processing circuitry 1641 and the transceiver 1610, shown and described above in connection with FIG. 16, may provide a means to transmit a second random access message including a first indication of the at least one beam.

At block 1806, the base station may receive the first random access message from the user equipment via a first beam of the at least one beam. For example, the RACH processing circuitry 1643 together with the communication and processing circuitry 1641 and the transceiver 1610 may provide a means to receive the first random access message from the user equipment via a first beam of the at least one beam.

In some examples, the first random access message may include a random access channel (RACH) radio resource control (RRC) connection request message or a RACH Msg3 message. In some examples, the second random access message may include a random access response (RAR) message or a RACH Msg2 physical downlink shared channel (PDSCH) message.

In some examples, selecting the at least one beam may include identifying a best beam of a plurality of physical random access channel (PRACH) beams transmitted by the user equipment. In some examples, the base station may identify a specific random access channel (RACH) occasion on which the best beam was received. In some examples, the first indication identifies the specific RACH occasion.

In some examples, the at least one beam is the first beam. In some examples, the at least one beam may include a plurality of beams.

In some examples, the base station may receive a third random access message from the user equipment via a first plurality of beams on a plurality of random access channel (RACH) occasions. In some examples, to receive the third random access message, the base station may combine repetitions of the third random access message received via the first plurality of beams on the plurality of RACH occasions.

In some examples, to receive the third random access message, the base station may receive a first repetition of the third random access message via a second beam of the first plurality of beams on a first RACH occasion of the plurality of RACH occasions, and receive a second repetition of the third random access message via a third beam of the first plurality of beams on a second RACH occasion of the plurality of RACH occasions. In some examples, the third beam has a different direction than the second beam.

In some examples, to receive the third random access message, the base station may receive a first repetition of the third random access message via a second beam of the first plurality of beams on a first set of symbols of a first RACH occasion of the plurality of RACH occasions, and receive a second repetition of the third random access message via a third beam of the first plurality of beams on a second set of symbols of the first RACH occasion. In some examples, the third beam has a different direction than the second beam.

In some examples, the base station may transmit a synchronization signal block (SSB) via a second plurality of beams. In some examples, the first plurality of beams is based on the second plurality of beams.

In some examples, the base station may select a specified number of beams for the user equipment to use for transmission of the third random access message, and transmit a second indication of the specified number of beams. In some examples, transmitting the second indication may include transmitting remaining system information (RMSI) that includes the second indication.

In some examples, the base station may transmit a second indication specifying that the user equipment is to transmit the third random access message via multiple beams. In some examples, transmitting the second indication may include transmitting remaining system information (RMSI) that includes the second indication.

In some examples, the base station may define a first physical random access channel (PRACH) preamble sequence for PRACH transmissions with beam sweeping, and define a second physical random access channel (PRACH) preamble sequence for PRACH transmissions without beam sweeping, wherein the second PRACH preamble sequence is different from the first PRACH preamble sequence. In some examples, the base station may transmit a second indication of the first PRACH preamble sequence to the user equipment. In some examples, receiving the third random access message may include receiving the first PRACH preamble sequence via the first plurality of beams on the plurality of RACH occasions after transmitting the second indication.

FIG. 19 is a flow chart illustrating an example method 1900 for wireless communication according to some aspects of the disclosure. In some examples, the method 1900 may be used in conjunction with (e.g., in addition to or as part of) the method 1700 of FIG. 17 and/or the method 1800 of FIG. 18. As described herein, some or all illustrated features may be omitted in a particular implementation within the scope of the present disclosure, and some illustrated features may not be required for implementation of all examples. In some examples, the method 1900 may be carried out by the BS 1600 illustrated in FIG. 16. In some examples, the method 1900 may be carried out by any suitable apparatus or means for carrying out the functions or algorithm described below.

At block 1902, a base station may receive a third random access message from the user equipment via a first plurality of beams on a plurality of random access channel (RACH) occasions. For example, the RACH processing circuitry 1643 together with the communication and processing circuitry 1641 and the transceiver 1610 may provide a means to receive a third random access message from the user equipment via a first plurality of beams on a plurality of random access channel (RACH) occasions.

At block 1904, the base station may identify a best beam of the first plurality of beams. For example, the RACH configuration circuitry 1642 together with the communication and processing circuitry 1641 and the transceiver 1610 may provide a means to identify a best beam of the first plurality of beams.

At block 1906, the base station may identify a specific random access channel (RACH) occasion on which the best beam was received. For example, the RACH configuration circuitry 1642 may provide a means to identify a specific random access channel (RACH) occasion on which the best beam was received.

At block 1908, the base station may transmit the second random access message including the first indication of the specific RACH occasion. For example, the RACH processing circuitry 1643 together with the communication and processing circuitry 1641 and the transceiver 1610 may provide a means to transmit the second random access message including the first indication of the specific RACH occasion.

At block 1910, the base station may receive the first random access message from the user equipment via the best beam. For example, the RACH processing circuitry 1643 together with the communication and processing circuitry 1641 and the transceiver 1610 may provide a means to receive the first random access message from the user equipment via the best beam.

In one configuration, the BS 1600 includes means for transmitting a first random access message including a first indication of least one beam selected for a user equipment to use for a transmission of a second random access message, and means for receiving the second random access message from the user equipment via a first beam of the at least one beam. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 5, 6, 7, 11, and 16, and utilizing, for example, the methods and/or algorithms described herein in relation to FIGS. 17-19.

The methods shown in FIGS. 13-15 and 17-19 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: receiving a first random access message comprising a first indication of at least one beam to use for a transmission of a second random access message to a base station; and transmitting the second random access message to the base station via a first beam identified based on the first indication.

Aspect 2: The method of aspect 1, wherein the first indication identifies: the first beam; a specific random access channel (RACH) occasion associated with the first beam; or a specific physical random access channel (PRACH) repetition associated with the first beam.

Aspect 3: The method of any of aspects 1 through 2, wherein: the first random access message comprises a random access response (RAR) message or a random access channel (RACH) Msg2 physical downlink shared channel (PDSCH) message; and the second random access message comprises a RACH radio resource control (RRC) connection request message or a RACH Msg3 message.

Aspect 4: The method of any of aspects 1 or 3, wherein: the first indication identifies a specific random access channel (RACH) occasion associated with the first beam; and identifying the first beam based on the first indication comprises identifying the first beam based on the specific RACH occasion.

Aspect 5: The method of any of aspects 1 through 4, wherein: the at least one beam comprises a plurality of beams; and identifying the first beam based on the first indication comprises selecting the first beam from the plurality of beams based on at least one factor.

Aspect 6: The method of aspect 5, wherein the at least one factor comprises at least one of: a maximum transmit power associated with the first beam, a location of an antenna panel used to transmit the first beam, a regulatory specific absorption rate (SAR), or a combination thereof.

Aspect 7: The method of any of aspects 1 through 6, further comprising: identifying a first plurality of beams for a transmission of a third random access message; and transmitting the third random access message to the base station via the first plurality of beams on a plurality of random access channel (RACH) occasions.

Aspect 8: The method of aspect 7, wherein transmitting the third random access message to the base station via the first plurality of beams on the plurality of RACH occasions comprises: transmitting a first repetition of the third random access message via a second beam of the first plurality of beams on a first RACH occasion of the plurality of RACH occasions; and transmitting a second repetition of the third random access message via a third beam of the first plurality of beams on a second RACH occasion of the plurality of RACH occasions, wherein the third beam has a different direction than the second beam.

Aspect 9: The method of aspect 7, wherein transmitting the third random access message to the base station via the first plurality of beams on the plurality of RACH occasions comprises: transmitting a first repetition of the third random access message via a second beam of the first plurality of beams on a first set of symbols of a first RACH occasion of the plurality of RACH occasions; and transmitting a second repetition of the third random access message via a third beam of the first plurality of beams on a second set of symbols of the first RACH occasion, wherein the third beam has a different direction than the second beam.

Aspect 10: The method of any of aspects 7 through 9, further comprising: receiving a synchronization signal block (SSB) transmission from the base station via a second plurality of beams; wherein identifying the first plurality of beams comprises selecting at least two beams based on the second plurality of beams.

Aspect 11: The method of any of aspects 7 through 10, further comprising: receiving a second indication to transmit the third random access message via a specified number of beams.

Aspect 12: The method of aspect 11, wherein identifying the first plurality of beams comprises: selecting the specified number of beams.

Aspect 13: The method of aspect 11, wherein receiving the second indication comprises: receiving remaining system information (RMSI) that includes the second indication from the base station.

Aspect 14: The method of aspect 7, further comprising: receiving a second indication to transmit the third random access message via multiple beams.

Aspect 15: The method of aspect 14, wherein transmitting the third random access message via the first plurality of beams on the plurality of RACH occasions is triggered by the second indication.

Aspect 16: The method of aspect 14, wherein receiving the second indication comprises: receiving remaining system information (RMSI) that includes the second indication from the base station.

Aspect 17: The method of aspect 7, further comprising: measuring a signal from the base station to provide a signal measurement value; and determining that the signal measurement value is greater than a threshold; wherein transmitting the third random access message via the first plurality of beams on the plurality of RACH occasions is triggered by the determining that the signal measurement value is greater than the threshold.

Aspect 18: The method of aspect 17, wherein measuring the signal from the base station to provide the signal measurement value comprises: measuring a received reference signal power (RSRP) of a synchronization signal block (SSB) transmission.

Aspect 19: The method of aspect 7, further comprising: receiving a second indication of a first physical random access channel (PRACH) preamble sequence to use for PRACH beam sweeping; wherein transmitting the third random access message comprises transmitting the first PRACH preamble sequence.

Aspect 20: The method of aspect 19, further comprising: receiving a third indication of a second PRACH preamble sequence for a transmission of the third random access message without PRACH beam sweeping; wherein the second PRACH preamble sequence is different from the first PRACH preamble sequence.

Aspect 22: A method for wireless communication at a base station, the method comprising: transmitting a first random access message comprising a first indication of at least one beam selected for a user equipment to use for a transmission of a second random access message; and receiving the second random access message from the user equipment via a first beam of the at least one beam.

Aspect 23: The method of aspect 22, wherein: the first random access message comprises a random access channel (RACH) radio resource control (RRC) connection request message or a RACH Msg3 message; and the second random access message comprises a random access response (RAR) message or a RACH Msg2 physical downlink shared channel (PDSCH) message.

Aspect 24: The method of aspect 22 through 23, wherein: selecting the at least one beam comprises identifying a best beam of a plurality of physical random access channel (PRACH) beams transmitted by the user equipment; the method further comprises identifying a specific random access channel (RACH) occasion on which the best beam was received; and the first indication identifies the specific RACH occasion.

Aspect 25: The method of any of aspects 22 through 24, wherein the at least one beam is the first beam.

Aspect 26: The method of any of aspects 22 through 24, wherein the at least one beam comprises a plurality of beams.

Aspect 27: The method of any of aspects 22 through 26, further comprising: receiving a third random access message from the user equipment via a first plurality of beams on a plurality of random access channel (RACH) occasions.

Aspect 28: The method of aspect 27, wherein receiving the third random access message comprises: combining repetitions of the third random access message received via the first plurality of beams on the plurality of RACH occasions.

Aspect 29: The method of aspect 27, wherein receiving the third random access message comprises: receiving a first repetition of the third random access message via a second beam of the first plurality of beams on a first RACH occasion of the plurality of RACH occasions; and receiving a second repetition of the third random access message via a third beam of the first plurality of beams on a second RACH occasion of the plurality of RACH occasions, wherein the third beam has a different direction than the second beam.

Aspect 30: The method of aspect 27, wherein receiving the third random access message comprises: receiving a first repetition of the third random access message via a second beam of the first plurality of beams on a first set of symbols of a first RACH occasion of the plurality of RACH occasions; and receiving a second repetition of the third random access message via a third beam of the first plurality of beams on a second set of symbols of the first RACH occasion, wherein the third beam has a different direction than the second beam.

Aspect 31: The method of any of aspects 27 through 30, further comprising: transmitting a synchronization signal block (SSB) via a second plurality of beams; wherein the first plurality of beams is based on the second plurality of beams.

Aspect 32: The method of any of aspects 27 through 31, further comprising: selecting a specified number of beams for the user equipment to use for a transmission of the third random access message; and transmitting a second indication of the specified number of beams to the user equipment.

Aspect 33: The method of aspect 32, wherein transmitting the second indication comprises: transmitting remaining system information (RMSI) that includes the second indication.

Aspect 34: The method of any of aspects 27 through 33, further comprising: transmitting a second indication specifying that the user equipment is to transmit the third random access message via multiple beams.

Aspect 35: The method of aspect 34, wherein transmitting the second indication comprises: transmitting remaining system information (RMSI) that includes the second indication.

Aspect 36: The method of aspect 27, further comprising: defining a first physical random access channel (PRACH) preamble sequence for PRACH transmissions with beam sweeping; and defining a second physical random access channel (PRACH) preamble sequence for PRACH transmissions without beam sweeping, wherein the second PRACH preamble sequence is different from the first PRACH preamble sequence.

Aspect 37: The method of aspect 36, further comprising: transmitting a second indication of the first PRACH preamble sequence to the user equipment; wherein receiving the third random access message comprises receiving the first PRACH preamble sequence via the first plurality of beams on the plurality of RACH occasions after transmitting the second indication.

Aspect 38: A user equipment (UE) comprising: a transceiver configured to communicate with a radio access network, a memory, and a processor communicatively coupled to the transceiver and the memory, wherein the processor and the memory are configured to perform any one of aspects 1 through 20.

Aspect 39: An apparatus configured for wireless communication comprising at least one means for performing any one of aspects 1 through 20.

Aspect 40: A non-transitory computer-readable medium storing computer-executable code, comprising code for causing an apparatus to perform any one of aspects 1 through 20.

Aspect 41: A base station (BS) comprising: a transceiver, a memory, and a processor coupled to the transceiver and the memory, wherein the processor and the memory are configured to perform any one of aspects 22 through 37.

Aspect 42: An apparatus configured for wireless communication comprising at least one means for performing any one of aspects 22 through 37.

Aspect 43: A non-transitory computer-readable medium storing computer-executable code, comprising code for causing an apparatus to perform any one of aspects 22 through 37.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1, 2, 5, 6, 7, 11, 12, and 16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
one or more memories storing processor-executable code; and
one or more processors configured to execute the processor-executable code and cause the user equipment to:
transmit a plurality of repetitions of a first random access message to a base station, the plurality of repetitions of the first random access message being transmitted via a first plurality of beams, the transmission of the plurality of repetitions comprising a first transmission of a first repetition of the plurality of repetitions of the first random access message via a second beam of the first plurality of beams on a first set of symbols of a first random access channel (RACH) occasion of a plurality of RACH occasions, and the transmission of the plurality of repetitions further comprising a second transmission of a second repetition of the plurality of repetitions of the first random access message via a third beam of the first plurality of beams on a second set of symbols of the first RACH occasion, wherein the third beam has a different direction than the second beam;
receive a second random access message comprising a first indication of a second plurality of beams to use for a transmission of a third random access message to the base station, the second plurality of beams being a subset of the first plurality of beams used for the transmission of the plurality of repetitions of the first random access message; and
transmit the third random access message to the base station, the transmission of the third random access message being via a first beam selected by the user equipment from the second plurality of beams.

2. The user equipment of claim 1, wherein the first indication identifies:
a specific physical random access channel (PRACH) repetition of the plurality of repetitions of the first random access message, the specific PRACH repetition being associated with the first beam.

3. The user equipment of claim 1, wherein:
the second random access message comprises a random access response (RAR) message or a RACH Msg2 physical downlink shared channel (PDSCH) message; and
the third random access message comprises a RACH radio resource control (RRC) connection request message or a RACH Msg3 message.

4. The user equipment of claim 1, wherein:
the first indication identifies a specific RACH occasion associated with the first beam; and
the one or more processors are further configured to execute the processor-executable code and cause the user equipment to identify the first beam based on the specific RACH occasion.

5. The user equipment of claim 1, wherein the one or more processors are further configured to execute the processor-executable code and cause the user equipment to select the first beam from the second plurality of beams based on a regulatory specific absorption rate (SAR).

6. The user equipment of claim 1, wherein the one or more processors are further configured to execute the processor-executable code and cause the user equipment to select the first beam from the second plurality of beams based on a location of an antenna panel used to transmit the first beam.

7. The user equipment of claim 1, wherein the one or more processors are further configured to execute the processor-executable code and cause the user equipment to:
receive a synchronization signal block (SSB) transmission from the base station via a third plurality of beams; and
identify the first plurality of beams based on the third plurality of beams.

8. The user equipment of claim 1, wherein the one or more processors are further configured to execute the processor-executable code and cause the user equipment to:
receive a second indication that specifies a number of beams that the user equipment is to use for physical random access channel (PRACH) beam sweeping.

9. The user equipment of claim 8, wherein the one or more processors are further configured to execute the processor-executable code and cause the user equipment to:
receive remaining system information (RMSI) that includes the second indication from the base station.

10. The user equipment of claim 1, wherein the one or more processors are further configured to execute the processor-executable code and cause the user equipment to:
receive a second indication to transmit the first random access message via multiple beams.

11. The user equipment of claim 10, wherein the one or more processors are further configured to execute the processor-executable code and cause the user equipment to:
transmit the first random access message via the first plurality of beams as triggered by the second indication.

12. The user equipment of claim 10, wherein the one or more processors are further configured to execute the processor-executable code and cause the user equipment to:
receive remaining system information (RMSI) that includes the second indication from the base station.

13. The user equipment of claim 1, wherein the one or more processors are further configured to execute the processor-executable code and cause the user equipment to:
  measure a signal from the base station to provide a signal measurement value;
  determine that the signal measurement value is less than a threshold; and
  enable beam sweeping for the transmission of the plurality of repetitions of the first random access message via the first plurality of beams based on the determination that the signal measurement value is less than the threshold.

14. The user equipment of claim 13, wherein the one or more processors are further configured to execute the processor-executable code and cause the user equipment to:
  measure a received reference signal power (RSRP) of a synchronization signal block (SSB) transmission to provide the signal measurement value.

15. The user equipment of claim 1, wherein the one or more processors are further configured to execute the processor-executable code and cause the user equipment to:
  receive a second indication of a first physical random access channel (PRACH) preamble sequence to use for PRACH beam sweeping; and
  transmit the plurality of repetitions of the first random access message based on the first PRACH preamble sequence.

16. The user equipment of claim 15, wherein:
  the one or more processors are further configured to execute the processor-executable code and cause the user equipment to receive a third indication of a second PRACH preamble sequence for a transmission of the first random access message without PRACH beam sweeping; and
  the second PRACH preamble sequence is different from the first PRACH preamble sequence.

17. A method for wireless communication at a user equipment, the method comprising:
  transmitting a plurality of repetitions of a first random access message to a base station, the plurality of repetitions of the first random access message being transmitted via a first plurality of beams, the transmitting the plurality of repetitions comprising a first transmission of a first repetition of the plurality of repetitions of the first random access message via a second beam of the first plurality of beams on a first set of symbols of a first random access channel (RACH) occasion of a plurality of RACH occasions, and the transmitting the plurality of repetitions further comprising a second transmission of a second repetition of the plurality of repetitions of the first random access message via a third beam of the first plurality of beams on a second set of symbols of the first RACH occasion, wherein the third beam has a different direction than the second beam;
  receiving a second random access message comprising a first indication of a second plurality of beams to use for a transmission of a third random access message to the base station, the second plurality of beams being a subset of the first plurality of beams used for the transmitting of the plurality of repetitions of the first random access message; and
  transmitting the third random access message to the base station, the transmitting of the third random access message being via a first beam selected by the user equipment from the second plurality of beams.

18. A base station, comprising:
  one or more memories storing processor-executable code; and
  one or more processors configured to execute the processor-executable code and cause the base station to:
    receive a plurality of repetitions of a first random access message from a user equipment, the plurality of repetitions of the first random access message being associated with a first plurality of beams, the reception of the plurality of repetitions comprising a reception of a first repetition of the plurality of repetitions of the first random access message via a second beam of the first plurality of beams on a first set of symbols of a first random access channel (RACH) occasion of a plurality of RACH occasions, and the reception of the plurality of repetitions further comprising a reception of a second repetition of the plurality of repetitions of the first random access message via a third beam of the first plurality of beams on a second set of symbols of the first RACH occasion, wherein the third beam has a different direction than the second beam;
    transmit a second random access message comprising a first indication of a second plurality of beams for the user equipment to use for a transmission of a third random access message, the second plurality of beams being selected from the first plurality of beams associated with the plurality of repetitions of the first random access message; and
    receive the third random access message from the user equipment via a single beam of the second plurality of beams.

19. The base station of claim 18, wherein the one or more processors are further configured to execute the processor-executable code and cause the base station to:
  identify a first beam of a plurality of physical random access channel (PRACH) beams transmitted by the user equipment; and
  identify a specific RACH occasion on which the first beam was received;
  wherein the first indication identifies the specific RACH occasion.

20. The base station of claim 18, wherein the one or more processors are further configured to execute the processor-executable code and cause the base station to:
  select a specified number of beams for the user equipment to use for a transmission of the first random access message; and
  transmit a second indication of the specified number of beams to the user equipment.

21. The base station of claim 18, wherein the one or more processors are further configured to execute the processor-executable code and cause the base station to:
  transmit to the user equipment a second indication specifying that the user equipment is to transmit the first random access message via multiple beams.

22. The base station of claim 18, wherein the one or more processors are further configured to execute the processor-executable code and cause the base station to:
  define a first physical random access channel (PRACH) preamble sequence for PRACH transmissions with beam sweeping; and
  define a second PRACH preamble sequence for PRACH transmissions without beam sweeping, wherein the second PRACH preamble sequence is different from the first PRACH preamble sequence.

23. The base station of claim 22, wherein the one or more processors are further configured to execute the processor-executable code and cause the base station to:
- transmit a second indication of the first PRACH preamble sequence to the user equipment; and
- receive the first PRACH preamble sequence via the first plurality of beams after transmission of the second indication.

24. A method for wireless communication at a base station, the method comprising:
- receiving a plurality of repetitions of a first random access message from a user equipment, the plurality of repetitions of the first random access message being associated with a first plurality of beams, the receiving the plurality of repetitions comprising a reception of a first repetition of the plurality of repetitions of the first random access message via a second beam of the first plurality of beams on a first set of symbols of a first random access channel (RACH) occasion of a plurality of RACH occasions, and the receiving the plurality of repetitions further comprising a reception of a second repetition of the plurality of repetitions of the first random access message via a third beam of the first plurality of beams on a second set of symbols of the first RACH occasion, wherein the third beam has a different direction than the second beam;
- transmitting a second random access message comprising a first indication of a second plurality of beams for the user equipment to use for a transmission of a third random access message, the second plurality of beams being selected from the first plurality of beams associated with the plurality of repetitions of the first random access message; and
- receiving the third random access message from the user equipment via a single beam of the second plurality of beams.

* * * * *